United States Patent
Burgess et al.

(10) Patent No.: US 9,729,437 B2
(45) Date of Patent: Aug. 8, 2017

(54) TRANSFERRING DATA BETWEEN A FIRST NETWORK NODE AND A SECOND NETWORK NODE BY MEASURING A CAPABILITY OF DIFFERENT COMMUNICATION PATHS

(71) Applicant: Bridgeworks Limited, Hampshire (GB)

(72) Inventors: Paul Burgess, Hampshire (GB); David Trossell, Hampshire (GB)

(73) Assignee: Bridgeworks Limited, Hampshire (GB)

( * ) Notice: Subject to any disclaimer, the term of this patent is extended or adjusted under 35 U.S.C. 154(b) by 0 days.

(21) Appl. No.: 15/039,160

(22) PCT Filed: Nov. 28, 2014

(86) PCT No.: PCT/GB2014/053534
§ 371 (c)(1),
(2) Date: May 25, 2016

(87) PCT Pub. No.: WO2015/079248
PCT Pub. Date: Jun. 4, 2015

(65) Prior Publication Data
US 2017/0019333 A1    Jan. 19, 2017

(30) Foreign Application Priority Data
Nov. 29, 2013 (GB) .................................. 1321148.7

(51) Int. Cl.
*H04W 28/14*    (2009.01)
*H04L 12/721*    (2013.01)
(Continued)

(52) U.S. Cl.
CPC ............ *H04L 45/70* (2013.01); *H04L 5/0055* (2013.01); *H04L 41/0816* (2013.01);
(Continued)

(58) Field of Classification Search
CPC ...... G06F 13/00; G06F 13/124; G06F 13/128; G06F 13/1657; G11C 7/10; H04B 3/23;
(Continued)

(56) References Cited

U.S. PATENT DOCUMENTS 5,802,153 A * 9/1998 Sridhar ................. G06F 13/128
                                                370/465
6,160,915 A    12/2000 Kato et al.
(Continued)

FOREIGN PATENT DOCUMENTS

CN    1713200 A    12/2005
EP    1892902 A2    2/2008
(Continued)

OTHER PUBLICATIONS

International Search Report of PCT/GB2014/053531, dated Feb. 6, 2015.
(Continued)

*Primary Examiner* — Le H Luu
(74) *Attorney, Agent, or Firm* — Banner & Witcoff, Ltd.

(57) ABSTRACT

Apparatus comprises:
first and second transmitter interfaces, each configured to transmit data over a respective communications path including one or more logical connections;
first and second transmit buffers forming part of the first and second transmitter interfaces respectively, the first and second transmit buffers being configured to store packets of data for transmission over their respective communication path;
one or more path capability determining modules configured to determine a measure of capability of each of the communications paths to transmit data;
an input data buffer configured to store data for provision to the first and second transmit buffers for subsequent transmission; and (Continued)

a data handling module configured to respond to determining the presence of data in the input buffer for transmission by:
  using the measured capabilities of the communication paths and measures of the quantity of data stored in the transmit buffers to select one of the first and second transmitter interfaces for transmitting data; and
  providing at least one packet of data to the transmit buffer of the selected one of the first and second transmitter interfaces.

25 Claims, 11 Drawing Sheets

(51) Int. Cl.
  H04L 12/26 (2006.01)
  H04L 29/06 (2006.01)
  H04L 5/00 (2006.01)
  H04L 12/803 (2013.01)
  H04L 12/24 (2006.01)
  H04L 12/807 (2013.01)
  H04L 12/863 (2013.01)
  H04L 12/931 (2013.01)
  H04L 29/08 (2006.01)

(52) U.S. Cl.
  CPC ...... H04L 43/0829 (2013.01); H04L 43/0876 (2013.01); H04L 43/0882 (2013.01); H04L 43/0888 (2013.01); H04L 43/0894 (2013.01); H04L 47/122 (2013.01); H04L 47/27 (2013.01); H04L 47/626 (2013.01); H04L 49/357 (2013.01); H04L 67/1097 (2013.01); H04L 69/14 (2013.01); H04L 69/16 (2013.01); H04L 69/22 (2013.01); H04W 28/14 (2013.01); H04L 69/163 (2013.01)

(58) Field of Classification Search
  CPC ... H04L 1/22; H04L 12/5693; H04L 12/5696; H04L 47/6205; H04L 67/1097; H04L 43/0876; H04L 43/0882; H04L 47/626; H04L 49/357; H04L 69/14; H04W 28/14
  See application file for complete search history.

(56) References Cited

U.S. PATENT DOCUMENTS

| | | | |
|---|---|---|---|
| 6,330,248 B1 | 12/2001 | Krishna et al. | |
| 6,700,902 B1 | 3/2004 | Meyer | |
| 7,339,892 B1 | 3/2008 | Engwer et al. | |
| 7,543,072 B1 | 6/2009 | Hertzog et al. | |
| 7,843,907 B1* | 11/2010 | Abou-Emara | H04L 47/6205 370/386 |
| 8,228,931 B1* | 7/2012 | Wallace | H04L 12/5696 370/428 |
| 8,245,101 B2* | 8/2012 | Olbrich | G06F 13/1657 714/6.24 |
| 8,325,601 B2 | 12/2012 | Martinez et al. | |
| 2002/0061012 A1* | 5/2002 | Thi | H04B 3/23 370/352 |
| 2003/0108063 A1 | 6/2003 | Joseph et al. | |
| 2003/0158992 A1* | 8/2003 | Ajanovic | G06F 13/124 710/305 |
| 2004/0003126 A1* | 1/2004 | Boucher | H04L 12/5693 709/250 |
| 2007/0263542 A1 | 11/2007 | Bammesreiter et al. | |
| 2008/0059602 A1 | 3/2008 | Matsuda et al. | |
| 2008/0291826 A1 | 11/2008 | Licardie et al. | |
| 2009/0271513 A1 | 10/2009 | Liu et al. | |
| 2009/0285098 A1 | 11/2009 | Qi | |
| 2010/0284275 A1 | 11/2010 | Martinez | |
| 2011/0280195 A1 | 11/2011 | Muppalla | |
| 2012/0151247 A1* | 6/2012 | Ferraiolo | H04L 1/22 714/4.5 |
| 2012/0166670 A1 | 6/2012 | Kure et al. | |
| 2013/0060906 A1 | 3/2013 | Gan | |
| 2013/0151646 A1* | 6/2013 | Chidambaram | H04L 47/6205 709/213 |
| 2013/0235739 A1 | 9/2013 | Mamidwar et al. | |
| 2014/0032799 A1* | 1/2014 | Dickson | G06F 13/00 710/104 |
| 2014/0192583 A1* | 7/2014 | Rajan | G11C 7/10 365/63 |

FOREIGN PATENT DOCUMENTS

| | | |
|---|---|---|
| EP | 2384073 A1 | 11/2011 |
| FR | 2951045 A1 | 4/2011 |
| GB | 2464793 A | 5/2010 |
| JP | 2001308915 A | 11/2001 |
| KR | 20020032730 A | 5/2002 |
| WO | 9107038 A2 | 5/1991 |
| WO | 0227991 A1 | 4/2002 |
| WO | 2005/104413 A1 | 11/2005 |
| WO | 2011/072537 A1 | 6/2011 |
| WO | 2011/101425 A1 | 8/2011 |

OTHER PUBLICATIONS

UK Search Report of GB1321148.7, dated Feb. 20, 2014.
International Preliminary Report of PCT/GB2014/053534, dated May 31, 2016.
Chinese Office Action of Application No. 201480074608.7, dated Apr. 6, 2017.

* cited by examiner

TRANSFERRING DATA BETWEEN A FIRST NETWORK NODE AND A SECOND NETWORK NODE BY MEASURING A CAPABILITY OF DIFFERENT COMMUNICATION PATHS

FIELD

The specification relates to transferring data between a first network node and a second network node.

BACKGROUND

The rate at which data can be transferred between network nodes using conventional methods can be limited by a number of factors. In order to limit network congestion and to ensure reliable transfers, a first node may be permitted to transmit only a limited amount of data before an acknowledgement message (ACK) is received from a second, receiving, node. Once an ACK message has been received by the first node, a second limited amount of data can be transmitted to the second node.

In Transmission Control Protocol/Internet Protocol (TCP/IP) systems, that limited amount of data relates to the amount of data that can be stored in a receive buffer of the second node and is referred to as a TCP/IP "receive window".

In conventional systems, the size of the TCP/IP window may be set to take account of the round-trip time between the first and second nodes and the available bandwidth. The size of the TCP/IP window can influence the efficiency of the data transfer between the first and second nodes because the first node may close the connection to the second node if the ACK message does not arrive within a predetermined period (the timeout period). Therefore, if the TCP/IP window is relatively large, the connection may be "timed out". Moreover, the amount of data may exceed the size of the receive buffer, causing error-recovery problems. However, if the TCP/IP window is relatively small, the available bandwidth might not be utilised effectively. Furthermore, the second node will be required to send a greater number of ACK messages, thereby increasing network traffic. In such a system, the data transfer rate is also determined by time required for an acknowledgement of a transmitted data packet to be received at the first node. In other words, the data transfer rate depends on the round-trip time between the first and second nodes.

The above shortcomings may be particularly significant in applications where a considerable amount of data is to be transferred. For instance, the data stored on a Storage Area Network (SAN) may be backed up at a remote storage facility, such as a remote disk library in another Storage Area Network (SAN). In order to minimise the chances of both the locally stored data and the remote stored data being lost simultaneously, the storage facility should be located at a considerable distance. In order to achieve this, the back-up data must be transmitted across a network to the remote storage facility. However, this transmission is subject to a limited data transfer rate. SANs often utilise Fibre Channel (FC) technology, which can support relatively high speed data transfer. However, the Fibre Channel Protocol (FCP) cannot normally be used over distances greater than 10 km, although a conversion to TCP/IP traffic can be employed to extend the distance limitation but is subject to the performance considerations described above.

SUMMARY

A first aspect of the specification provides apparatus comprising:

first and second transmitter interfaces, each configured to transmit data over a respective communications path including one or more logical connections;

first and second transmit buffers forming part of the first and second transmitter interfaces respectively, the first and second transmit buffers being configured to store packets of data for transmission over their respective communication path;

one or more path capability determining modules configured to determine a measure of capability of each of the communications paths to transmit data;

an input data buffer configured to store data for provision to the first and second transmit buffers for subsequent transmission; and a data handling module configured to respond to determining the presence of data in the input buffer for transmission by:

using the measured capabilities of the communication paths and measures of the quantity of data stored in the transmit buffers to select one of the first and second transmitter interfaces for transmitting data; and providing at least one packet of data to the transmit buffer of the selected one of the first and second transmitter interfaces.

The one or more path capability determining modules may be configured to measure one or more transmission parameters and to use the measured one or more transmission parameters to determine the measure of capability of each of the communications paths to transmit data.

The one or more transmission parameters may include one or more of: packet loss, latency and path speed.

The one or more transmission parameters may include at least path speed.

The apparatus may comprise first and second path capability determining modules, each relating to a different one of the communication paths.

The measure of capability of each of the communications paths to transmit data may comprise a number of bytes that are required to be put onto the path per unit time.

The data handling module may be configured to use a measure of a quantity of data that has been sent over the communications paths but for which acknowledgements have not yet been received to select one of the first and second transmitter interfaces for transmitting data.

The one or more path capability determining modules may be configured to determine the quantity of data that has been sent over a communications path but for which acknowledgements have not yet been received.

The data handling module may be configured to calculate a path satisfaction value as a function of path speed and a quantity of data that has been sent over a communications path but for which acknowledgements have not yet been received, and to use the path satisfaction value to select one of the first and second transmitter interfaces for transmitting data.

The providing the at least one packet of data to the transmit buffer of the selected one of the first and second transmitter interfaces may comprise providing a transfer packet having a length equal to or less than an optimal packet length for the corresponding path.

The providing the at least one packet of data to the transmit buffer of the selected one of the first and second transmitter interfaces may comprise:

determining if a data segment in the input data buffer has a length exceeding the optimal packet length for the corresponding path on a positive determination, forming a transfer packet having a length equal to the optimal packet length for the path, for provision to the transmit buffer of the selected one of the first and second transmitter interfaces; and providing the formed transfer packet to the transmit buffer of the selected one of the first and second transmitter interfaces.

A second aspect of the specification provides a method comprising:

each of first and second transmitter interfaces transmitting data over a respective communications path including one or more logical connections;

each of first and second transmit buffers, forming part of the first and second transmitter interfaces respectively, storing packets of data for transmission over their respective communication path;

one or more path capability determining modules determining a measure of capability of each of the communications paths to transmit data;

an input data buffer storing data for provision to the first and second transmit buffers for subsequent transmission; and a data handling module responding to determining the presence of data in the input buffer for transmission by:
using the measured capabilities of the communication paths and measures of the quantity of data stored in the transmit buffers to select one of the first and second transmitter interfaces for transmitting data; and providing at least one packet of data to the transmit buffer of the selected one of the first and second transmitter interfaces.

The method may comprise the one or more path capability determining modules measuring one or more transmission parameters and using the measured one or more transmission parameters to determine the measure of capability of each of the communications paths to transmit data.

The one or more transmission parameters may include one or more of: packet loss, latency and path speed.

The one or more transmission parameters may include at least path speed.

There may be first and second path capability determining modules, each relating to a different one of the communication paths.

The measure of capability of each of the communications paths to transmit data may comprise a number of bytes that are required to be put onto the path per unit time.

The method may comprise the data handling module using a measure of a quantity of data that has been sent over the communications paths but for which acknowledgements have not yet been received to select one of the first and second transmitter interfaces for transmitting data.

The method may comprise the one or more path capability determining modules determining the quantity of data that has been sent over a communications path but for which acknowledgements have not yet been received.

The method may comprise the data handling module calculating a path satisfaction value as a function of path speed and a quantity of data that has been sent over a communications path but for which acknowledgements have not yet been received, and using the path satisfaction value to select one of the first and second transmitter interfaces for transmitting data.

The providing the at least one packet of data to the transmit buffer of the selected one of the first and second transmitter interfaces may comprise providing a transfer packet having a length equal to or less than an optimal packet length for the corresponding path.

The providing the at least one packet of data to the transmit buffer of the selected one of the first and second transmitter interfaces may comprise:

determining if a data segment in the input data buffer has a length exceeding the optimal packet length for the corresponding path on a positive determination, forming a transfer packet having a length equal to the optimal packet length for the path, for provision to the transmit buffer of the selected one of the first and second transmitter interfaces; and providing the formed transfer packet to the transmit buffer of the selected one of the first and second transmitter interfaces.

The method may be performed by a bridge.

A third aspect of the specification provides a computer program comprising machine readable instructions that when executed by computing apparatus causes it to perform any above method.

A fourth aspect of the specification provides apparatus, the apparatus having at least one processor and at least one memory having computer-readable code stored therein which when executed controls the at least one processor to perform a method comprising:

each of first and second transmitter interfaces transmitting data over a respective communications path including one or more logical connections;

each of first and second transmit buffers, forming part of the first and second transmitter interfaces respectively, storing packets of data for transmission over their respective communication path;

one or more path capability determining modules determining a measure of capability of each of the communications paths to transmit data;

an input data buffer storing data for provision to the first and second transmit buffers for subsequent transmission; and a data handling module responding to determining the presence of data in the input buffer for transmission by:
using the measured capabilities of the communication paths and measures of the quantity of data stored in the transmit buffers to select one of the first and second transmitter interfaces for transmitting data; and providing at least one packet of data to the transmit buffer of the selected one of the first and second transmitter interfaces.

A fifth aspect of the specification provides a non-transitory computer-readable storage medium having stored thereon computer-readable code, which, when executed by computing apparatus causes it to perform a method comprising:

each of first and second transmitter interfaces transmitting data over a respective communications path including one or more logical connections;

each of first and second transmit buffers, forming part of the first and second transmitter interfaces respectively, storing packets of data for transmission over their respective communication path;

one or more path capability determining modules determining a measure of capability of each of the communications paths to transmit data;

an input data buffer storing data for provision to the first and second transmit buffers for subsequent transmission; and a data handling module responding to determining the presence of data in the input buffer for transmission by:
using the measured capabilities of the communication paths and measures of the quantity of data stored in the transmit buffers to select one of the first and second transmitter interfaces for transmitting data; and
providing at least one packet of data to the transmit buffer of the selected one of the first and second transmitter interfaces.

BRIEF DESCRIPTION OF THE DRAWINGS

Embodiments of the present specification will now be described with reference to the accompanying drawings, in which.

DETAILED DESCRIPTION

In brief, embodiments of the specification relate to a bridge comprising first and second transmitter interfaces. Each is configured to transmit data over a respective communications path including one (or advantageously more than one) logical connection. Each interface has a respective transmit buffer configured to store packets of data for transmission over the respective communication path. One or more path capability determining modules, for instance artificial intelligence modules, determine a measure of capability of each of the communications paths to transmit data. A dispatcher uses this information along with measures of the quantity of data stored in the transmit buffers to determine which transmit buffer is to receive a next packet of data from an input buffer. Particularly if the path includes more that one logical connection, the size of the data packet provided to the transmit buffer may be much larger than the sizes of the packets that are transmitted over the logical connections, in the sense that the data packet provided to the transmit buffer is split and different parts are sent over multiple logical connections. The embodiments can allow effective transmission of data over a link that comprises multiple communication paths, particularly if the communication paths have different characteristics and different capabilities to transmit data.

Figure 1:
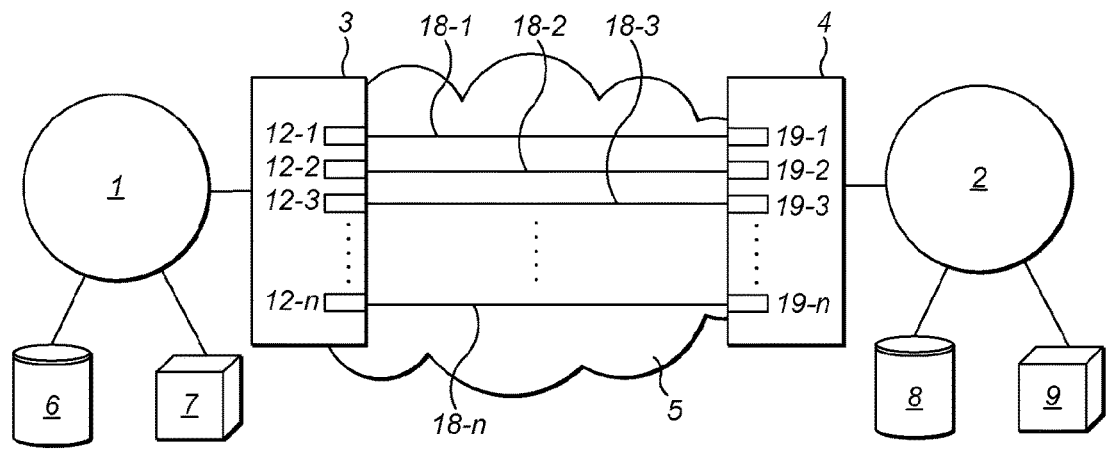
FIG. 1 depicts a system according to embodiments of the present specification.

FIG. 1 depicts a system according to embodiments of the specification. In this particular example, the system includes a local Storage Area Network (SAN) 1, and a remote SAN 2. The remote SAN 2 is arranged to store back-up data from clients, servers and/or local data storage in the local SAN 1.

Two bridges 3, 4, associated with the local SAN 1 and remote SAN 2 respectively, are connected via a path 5. The bridges 3, 4 are examples of network nodes. The path 5 provides a number of physical paths between the bridges 3, 4. In this particular example, the path 5 is a path over an IP network and the bridges 3 and 4 can communicate with each other using the Transmission Control Protocol (TCP). The communication paths between the bridges 3, 4 may include any number of intermediary routers and/or other network elements. Other devices 6, 7 within the local SAN 1 can communicate with devices 8 and 9 in the remote SAN 2 using the bridging system formed by the bridges 3, 4 and the path 5.

Figure 2:
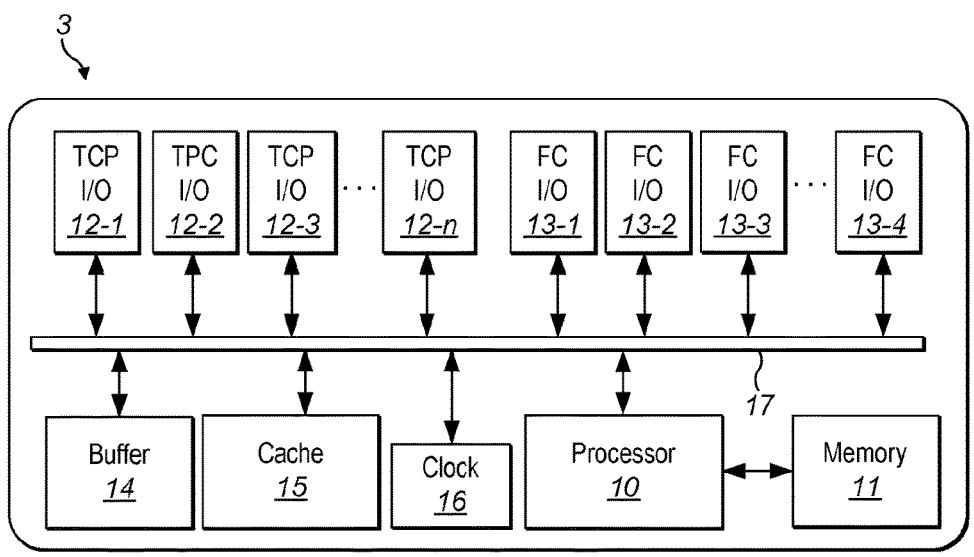
FIG. 2 depicts a node in the system of FIG. 1.

FIG. 2 is a block diagram of the local bridge 3. The bridge 3 comprises a processor 10, which controls the operation of the bridge 3 in accordance with software stored within a memory 11, including the generation of processes for establishing and releasing connections to other bridges 4 and between the bridge 3 and other devices 6, 7 within its associated SAN 1.

The connections between the bridges 3, 4 utilise I/O ports 12-1~12-$n$, which are physical ports over which the TCP protocol is transmitted and received. A plurality of Fibre Channel (FC) ports 13-1~13-$n$ may also be provided for communicating with the SAN 1. The FC ports 13-1~13-$n$ operate independently of, and are of a different type and specification to, ports 12-1~12-$n$. The bridge 3 can transmit and receive data over multiple connections simultaneously using the ports 12-1~12-$n$ and the FC Ports 13-1~13-$n$.

A plurality of buffers 14 are provided for storing data for transmission by the bridge 3. A plurality of caches 15 together provide large capacity storage while a clock 16 is arranged to provide timing functions. The processor 10 can communicate with various other components of the bridge 3 via a bus 17.

Figure 3:
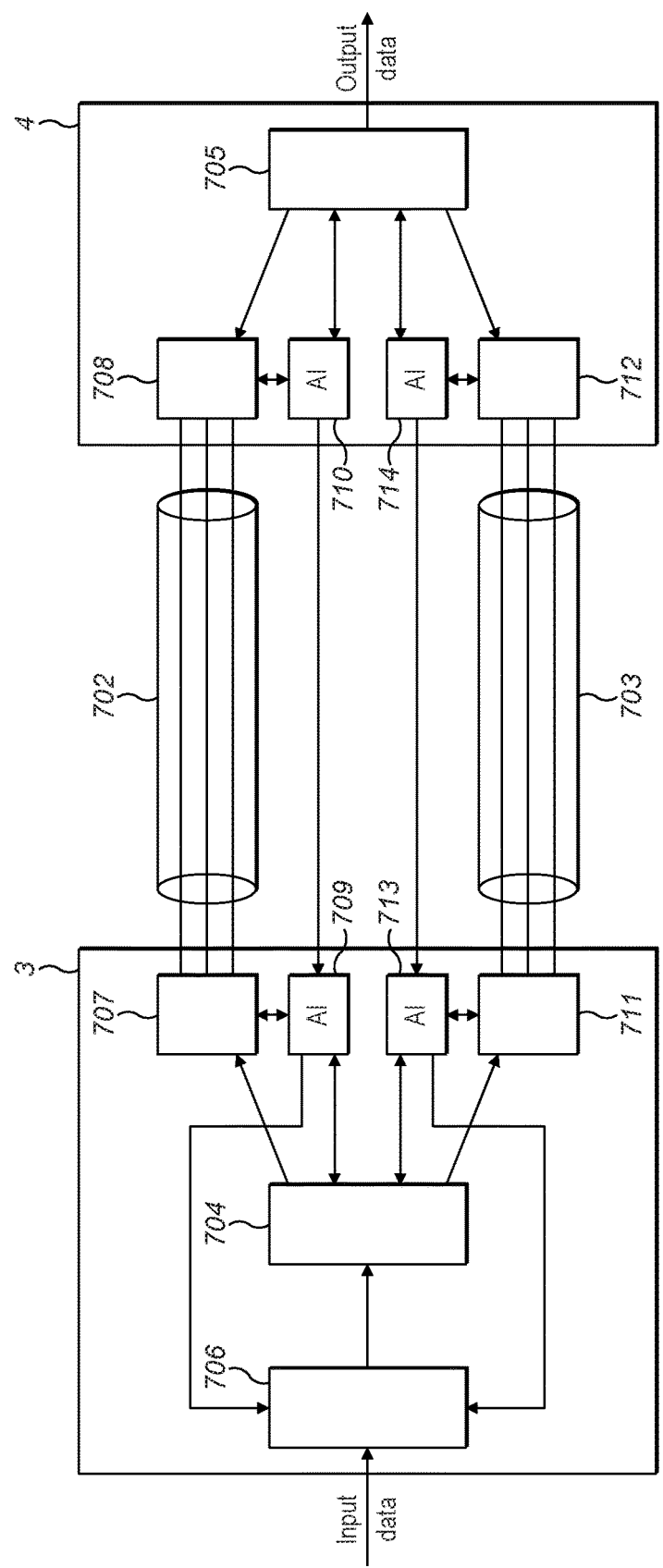
FIG. 3 is a schematic diagram illustrating a system according to embodiments of the present specification, and is an alternative to the system of FIG. 1.

FIG. 3 is a schematic diagram illustrating a system according to embodiments of the specification in which the two bridges 3, 4, associated with the local SAN 1 and remote SAN 2 respectively, are connected via first and second paths 702, 703. Other features from the FIG. 1 system are present in the FIG. 3 system but are omitted from the Figure for improved clarity. These features include the plurality of I/O ports 12-1~12-$n$, the Fibre Channel (FC) ports 13-1~13-$n$ etc.

The memory 11 stores software (computer program instructions) that, when loaded into the processor 10, control the operation of the local bridge 3. The software includes an operating system and other software, for instance firmware and/or application software.

The computer program instructions provide the logic and routines that enables the local bridge 3 to perform the functionality described below. The computer program instructions may be pre-programmed into the local bridge 3. Alternatively, they may arrive at the local bridge 3 via an electromagnetic carrier signal or be copied from a physical entity such as a computer program product, a non-volatile electronic memory device (e.g. flash memory) or a record medium such as a CD-ROM or DVD. They may for instance be downloaded to the local bridge 3, e.g. from a server.

The processor 10 may be any type of processor with processing circuitry. For example, the processor 10 may be a programmable processor that interprets computer program instructions and processes data. The processor 10 may include plural processors. Each processor may have one or more processing cores. The processor 10 may comprise a single processor that has multiple cores. Alternatively, the processor 10 may be, for example, programmable hardware with embedded firmware. The processor 10 may be termed processing means.

The remote bridge 4 is configured similarly to the local bridge 3, and FIG. 2 and the above description applies also to the remote bridge 4.

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories. Examples of volatile memory include RAM, DRAM, SDRAM etc. Examples of non-volatile memory include ROM, PROM, EEPROM, flash memory, optical storage, magnetic storage, etc.

The local bridge 3 and the remote bridge 4 as shown in FIG. 3 include a number of interconnected components. The bridges 3, 4, which will now be described with reference to FIG. 3, which allows operation of the bridges and their interworking to be explained.

Input data is received and stored in memory under control of a data cache 706 in the local bridge 3. One data cache 706 is provided for each storage device 8, 9 that is connected to the remote bridge 4. To simplify the following description, the operation of a single data cache 706 will be described. The input data is received as discreet data segments. The data segments in the input data are in the form in which they were received on the host interface (e.g. the FC interface 13), although with the protocol removed/stripped. The data segments are data that is required to be communicated to the remote bridge 4. The data segments may be packets of data, but they should not be confused with the transfer packets that are discussed in this specification. The data segments include headers that contain a description of the data, its source and destination, size and memory vectors.

An output of the data cache 706 is connected to an input of a dispatcher 704. As such, input data is provided to the dispatcher 704 by the data cache 706. The dispatcher is an example of a data handling module.

The input data is stored in memory in the local bridge 3 and is managed by the data cache 706. The data cache 706 manages the storage etc. of commands and data that pass in both directions, that is from the SAN 1 to the SAN 2 and vice versa. The cache 706 manages protocol interaction with the SANs 1, 2 or other hosts. Examples of actions performed by the cache 706 include receiving write commands, opening channels to allow a host to write data, etc.

From the dispatcher 704, the input data may be provided either to a first path transmitter interface 707 or a second path transmitter interface 711.

The first path transmitter interface 707 is connected via the path 702 to a first path receiver interface 708 in the receiver. Similarly, the second path transmitter interface 711 is connected by the second path 703 to a second path receiver interface 712 in the remote bridge 4.

Each of the paths 702, 703 includes multiple logical connections. Each of the paths 702, 703 has one or more physical ports. These ports and logical connections may be provided as described below with reference to FIG. 4. Alternatively, they may be provided as described below with reference to FIG. 6. In either case, the number of logical connections is selected so as to provide suitable performance of data transfer over the respective path, 702, 703. In the case of the method of FIG. 6, the number of logical connections is managed so as to optimise performance.

The ports 12-1~12-n shown in the bridge 3 of FIG. 1 are included in the first transmitter interface 707 of FIG. 3, but are omitted from the Figure for clarity. Similarly, ports 12-1~12-n are provided within the second transmitter interface 711. Corresponding ports 19-1~19-n are provided in the first and second path receiver interfaces 708, 712 of the remote bridge 4.

A first path transmitter artificial interface (AI) module 709 is provided in the local bridge 3. The first path transmitter AI module 709 is coupled in a bi-directional manner to both the first path transmitter interface 707 and the dispatcher 704. Additionally, it is connected to receive signalling from a first path receiver AI module 710, that is located in the remote bridge 4. The first path receiver AI module 710 is coupled in a bi-directional manner both to the first path receiver interface 708 and to the output cache 705.

Similarly, a second path transmitter AI module 713 is located in the local bridge 3, and is connected in a bi-directional manner both to the second path transmitter interface 711 and to the dispatcher 704. A second path receiver AI module 714 is located in the remote bridge 4, and is bi-directionally coupled both to the output cache 705 and to the second path receiver interface 712. The second path AI module 713 is connected to receive signalling from the second path receiver AI module 714.

The dispatcher 704 is configured to determine which of the first path transmitter interface 707 and the second path transmitter interface 711 is to be provided with data segments for transmission over its respective path 702, 703. Operation of the dispatcher 704 is described in detail below.

In the remote bridge 4, a combiner/cache 705 is provided. The combiner/cache 705 provides the function of a cache and the function of a combiner. Alternatively, separate modules may be included in the remote bridge 4 such as to provide these functions. Output data is stored in memory in the receiver 702 and is managed by the cache/combiner 705.

The combiner/cache 705 causes the combining of data that is received over the first and second paths 702, 703 within the output cache 705. The data is combined by the combiner 705 such that the output data that results from the cache 705 comprises data segments in the correct order, that is it is in the order in which the at a segments were received as input data at the local bridge 3. The combination of data within the output cache 705 is performed by the combiner 705 based on the examination of headers.

Figure 4:
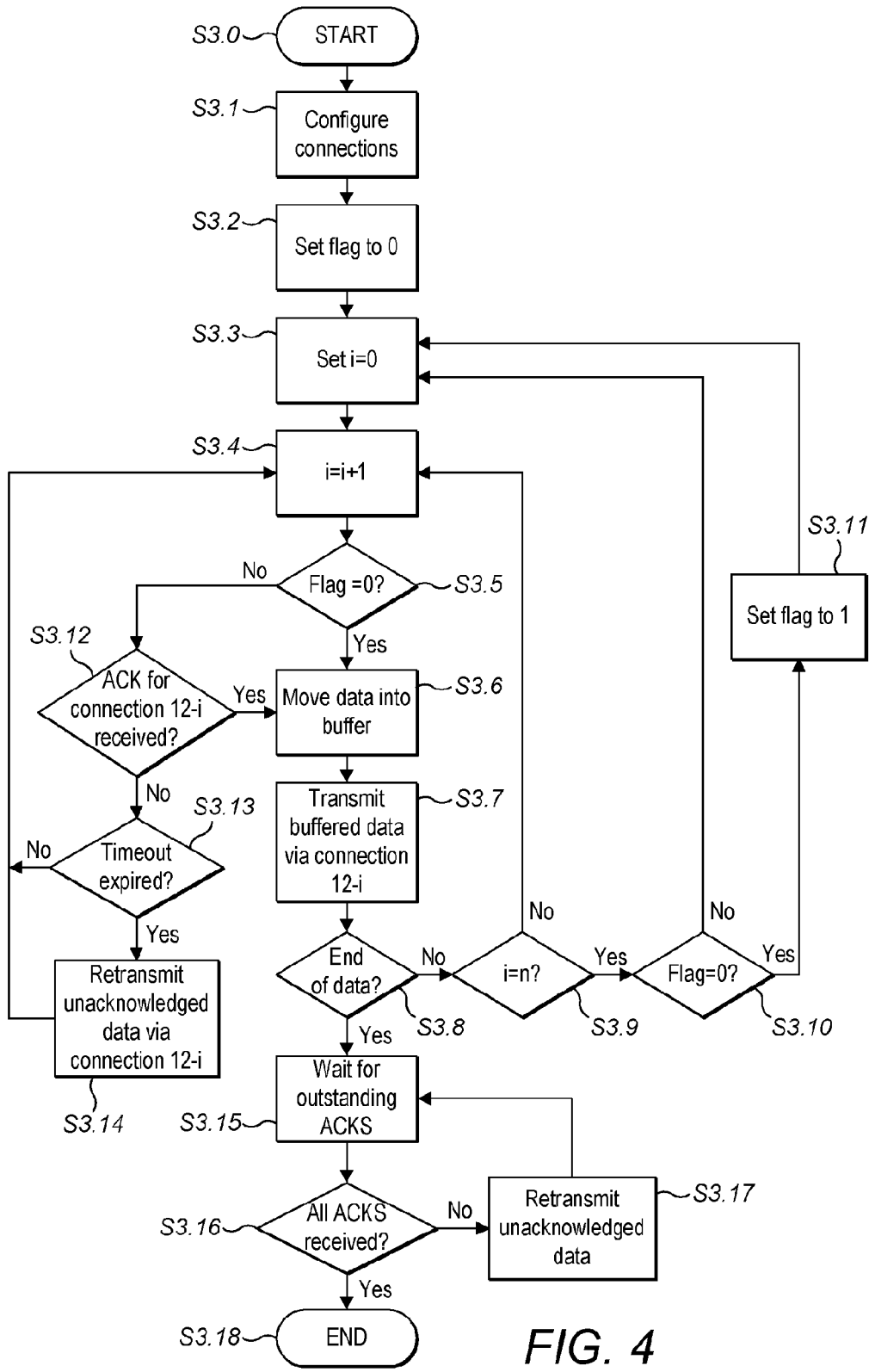
FIG. 4 is a flowchart illustrating a method of transmitting data between a transmitter and a receiver according to embodiments of the present specification.
Figure 5:
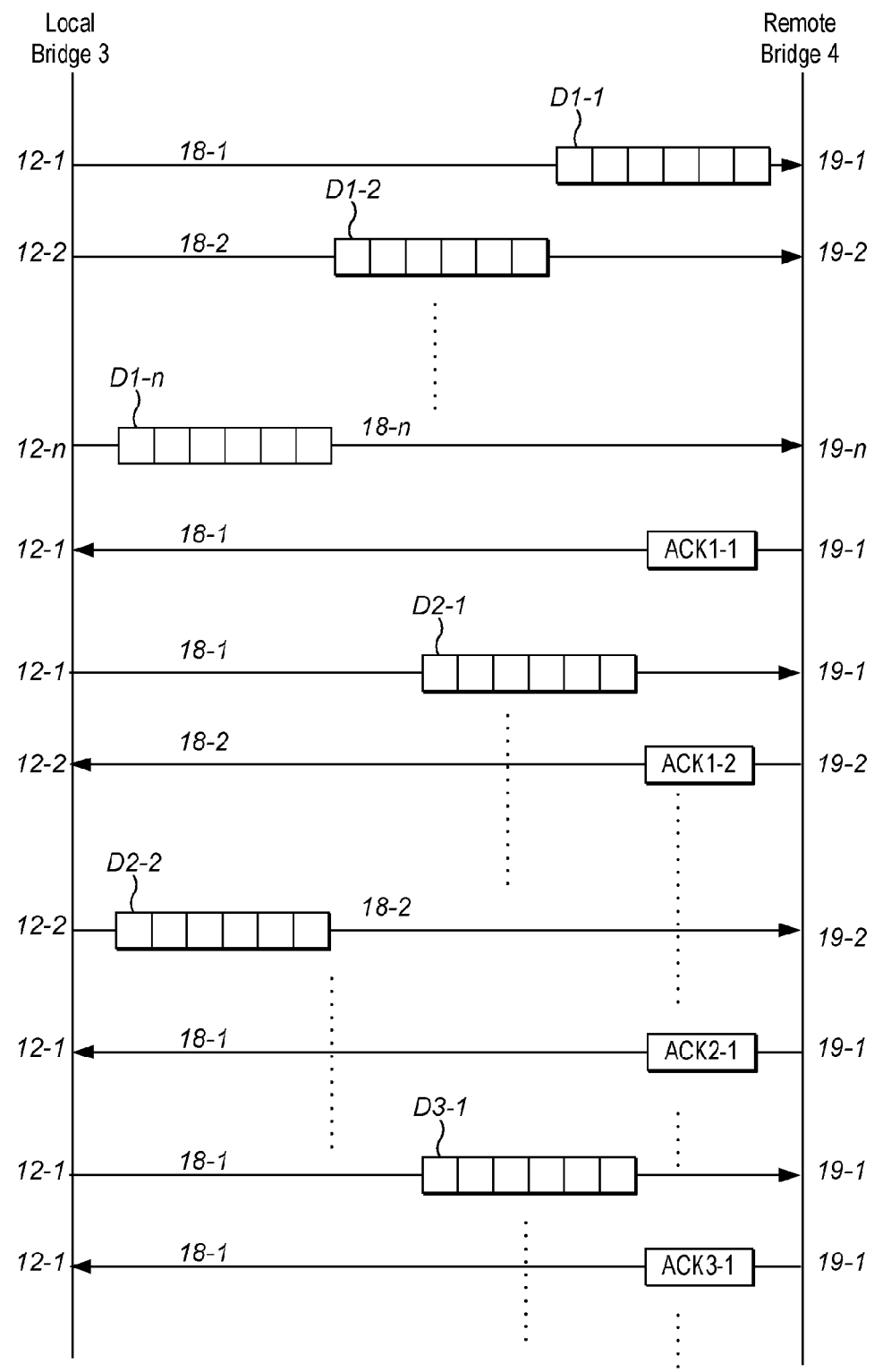
FIG. 5 depicts data transfer in the system of FIG. 1 or FIG. 3.

Referring to FIGS. 1 and 4, in order to transfer data, multiple logical connections 18-1~18-n are established between ports 12-1~12-n of the bridge 3 and corresponding ports 19-1~19-n of the remote bridge 4. In this manner, a first batch of data segments D1-1 can be transmitted from a first one of said ports 12 via a logical connection 18-1. Instead of delaying any further transmission until an acknowledgement ACK1-1 for the first batch of data segments to be received, further batches of data segments D1-2 to D1-n are transmitted using the other logical connections

18-1~18-n. Once the acknowledgement ACK1-1 has been received, a new batch of data segments D2-1 is sent to the remote bridge 4 via the first logical connection 18-1, starting a repeat of the sequence of transmissions from logical connections 18-1~18-n. Each remaining logical connection transmits a new batch of data segments D2-2 once an acknowledgement for the previous batch of data segments D1-2 sent via the corresponding logical connection 18-1~18-n is received. In this manner, the rate at which data is transferred need not be limited by the round trip time between the bridges 3, 4. When multiple ports 12 are used to transmit data between bridges 3, 4, a number of logical connections 18 are associated with each port. As is explained below, the number of logical connections provided with a given port 12 depends on the physical path capability and the round trip time for that path 5.

A batch of data segments in this context constitutes a transfer packet. Data segments do not have headers since they have been stripped of protocol when they arrived at the bridge 3. A transfer packet has an associated header, and the creation and handling of transfer packets is discussed in detail later in this specification.

Plural network payload packets are created from the data segments, as is described in more detail below. In brief, a transfer packet includes one data segment, plural data segments, or part of a data segment. A network payload packet includes one or more transfer packets. Each transfer packet is provided with a header specifically relating to the transfer packet. A network payload packet is not provided with a header, although each network payload packet includes at least one transfer packet header. When a network payload packet is sent over a path, it typically is provided with a header by the protocol used for that path. For instance, a network payload packet sent over a TCP path is provided with a TCP header by the protocol handler.

A method of transmitting data from the bridge 3 to the remote bridge 4, used in embodiments of the specification, will now be described with reference to FIGS. 1, 3 and 4.

Starting at step s3.0, the bridge 3 configures N logical connections 18-1~18-n between its ports 12-1~12-n and corresponding ports 19-1~19-n of the remote bridge 4 (step s3.1). Each port 12 has one or more logical connections 18 associated with it, i.e. each port 12 contributes in providing one or more logical connections 18.

Where the bridge 3 is transferring data from the SAN 1, it may start to request data from other local servers, clients and/or storage facilities 6, 7, which may be stored in the cache 15. Such caches 15 and techniques for improving data transmission speed in SANs are described in US 2007/0174470 A1, the contents of which are incorporated herein by reference. Such a data retrieval process may continue during the following procedure.

As described above, the procedure for transmitting the data to the remote bridge 4 includes a number of transmission cycles using the logical connections 18-1-18-n in sequence. A flag is set to zero (step s3.2), to indicate that the following cycle is the first cycle within the procedure.

A variable i, which identifies a logical connection used to transmit network payload packets, is set to 1 (steps 3.3, 3.4).

As the procedure has not yet completed its first cycle (step s3.5), the bridge 3 does not need to check for acknowledgements of previously transmitted data. Therefore, the processor 10 transfers a first batch of data segments D1-1 to be transmitted into the buffer 14 (step s3.6). The first batch of packets together constitute a network payload packet. The size of the network payload packet is selected so as to maximise efficiency of the data transfer, as is described below. The buffered data segments D1-1 are then transmitted as a network payload packet via logical connections 18-i which, in this example, is logical connection 18-1 (step s3.7).

As there remains data to be transmitted (step s3.8) and not all the logical connections 18-1~18-n have been utilised in this cycle (step s3.9), i is incremented (step s3.4), in order to identify the next logical connection and steps s3.5-s3.9 are performed to transmit a second batch of data segments D1-2 (a second network payload packet) using logical connection 12-i, i.e. logical connection 18-2. Steps s3.4-s3.9 are repeated until a respective batch of data segments D1-1 to D1-n (a network payload packet) has been sent to the remote bridge 4 using each of the logical connections 8-1~18-n.

As the first cycle has now been completed (step s3.10), the flag is set to 1 (step s3.11), so that subsequent data transmissions are made according to whether or not previously network payload packets have been acknowledged.

Subsequent cycles begin by resetting i to 1 (steps s3.3, s3.4). Beginning with port 18-1, it is determined whether or not an ACK message ACK1-1 for the network payload packet D1-1 most recently transmitted from port 12-1 has been received (step s3.12). If an ACK message has been received (step s3.12), a new network payload packet D2-1 is moved into the buffer 14 (step s3.6) and transmitted (step s3.7). If the ACK message has not been received, it is determined whether the timeout period for logical connection 18-1 has expired (step s3.13). If the timeout period has expired (step s3.13), the unacknowledged data is retrieved and retransmitted via logical connection 18-1 (step s3.14).

If an ACK message has not been received (step s3.12) but the timeout period has not yet expired (step s3.14), no further data is transmitted from logical connection 18-1 during this cycle. This allows the transmission to proceed without waiting for the ACK message for that particular logical connection 18-1 and checks for the outstanding ACK message are made during subsequent cycles (step s3.12) until either an ACK is received network payload packet D2-1 is transmitted using logical connection 18-1 (steps s3.6, s3.7) or the timeout period expires (step s3.13) and the network payload packet D1-1 is retransmitted (step s3.14).

The procedure then moves on to the next logical connection 18-2, repeating steps s3.4, s3.5, s3.12 and s3.7 to s3.9 or steps s3.4, s3.5, s3.12, s3.13 and s3.14 as necessary.

Once data has been newly transmitted using all N logical connections (step s3.9, s3.10), i is reset (steps s3.3, s3.4) and a new cycle begins.

Once all the data has been transmitted (step s3.8), the processor 10 waits for the reception of outstanding ACK messages (step s3.15). If any ACKs are not received after a predetermined period of time (step s3.16), the unacknowledged data is retrieved from the cache 15 or the relevant element 6, 7 of the SAN 1 and retransmitted (step s3.17). The predetermined period of time may be equal to, or greater than, the timeout period for the logical connections 18-1~18-n, in order to ensure that there is sufficient time for any outstanding ACK messages to be received.

When all of the transmitted data, or an acceptable percentage thereof, has been acknowledged (step s3.16), the procedure ends (step s3.18).

In the method of FIG. 3, the number N of connections is greater than 1, and the number of connections is fixed. The use of plural connections results in improved performance of data transmission, compared to a corresponding system in which only one connection is used, but utilises more system resources than such a corresponding system.

An alternative method of transmitting data will now be described with reference to FIG. 6. This method involves optimising the number of logical connections used to transfer data over the path 5, 702, 703.

Here, the operation starts at step S1.

At step S2, values of x and n are initialised to zero. A count of the network payload packets that are transmitted is indicated by n. A count of the acknowledgements that have been received is indicated by x.

At step S3, data is moved to the transmit buffer 14, which is shown in FIG. 2, ready for transmission.

At step S4, it is determined whether a logical connection 18 is available. This determination is carried out by examining each of the logical connections 18 that have previously been created and determining for which of those logical connections 18 an acknowledgement has been received for the network payload packet last transmitted over that logical connection. A logical connection 18 is available if an acknowledgment of the last transmitted network payload packet has been received.

As will be appreciated from the above description with reference to FIGS. 1 and 4, there is a plural-to-one relationship between logical connections 18 and ports 12. In TCP embodiments, an available logical connection 18 is an established TCP connection between bridges 3, 4 that is not processing data for transmission and has no outstanding acknowledgments.

If no logical connections 18 are available, a new logical connection 18 is created at step S5 by establishing a TCP Stream socket between the bridges 3, 4. If a logical connection 18 was determined to be available at step S4 or after the creation of a new logical connection 18 at step S5, network transfer packet n is transmitted on the logical connection 18 at step S6. Here, the logical connection 18 is one for which there is no outstanding acknowledgement. For a new logical connection 18, no network transfer packets will have been sent over the logical connection 18 previously. For an existing logical connection 18, a network transfer packet been sent previously but an acknowledgment has been received for the transmitted network transfer packet.

Following step S6, n is incremented at step S7. Following step S7, it is determined at step S8 whether the data moved to the buffer in step S3 constitutes the end of the data to be transmitted. If there are no more network transfer packets to be transmitted, step S8 results in a positive determination. If there is at least one more network transfer packet to be transmitted, step S8 provides a negative determination, and the operation proceeds to step S9.

At step S9, it is determined whether an acknowledgement for the network transfer packets x has been received from the remote bridge 4.

If it is determined that an acknowledgment for network transfer packet x has not been received, at step S10 it is determined whether a timeout for the data has expired. The value of the timer used in the timeout determination at step S10 may take any suitable value. For a high latency path between the bridges 3 and 4, the value of the timeout may be relatively high. If the timeout has expired, the network transfer packet from the buffer x is retransmitted at step S11.

If it is determined at step S9 that an acknowledgement for the network transfer packet x has been received, the value of x is incremented at step S12. Following step S12, excess logical connections 18 are destroyed at step S12. To determine excess logical connections, each is first verified to ensure that no data transmissions are in progress and no acknowledgements are outstanding. Excess logical connections are destroyed in a controlled manner. This occurs by the sending of a FIN message from the bridge 3 to the remote bridge 4, which responds by sending an ACK message to the bridge 3 acknowledging the FIN message. The FIN message is in respect of the excess logical connection. The FIN message indicates that there is no more data to be transmitted from the sender. Receipt of the ACK message at the local bridge 3 completes the operation.

In the case of the first path 702, the first path transmitter interface 707 is responsible for the creation and destruction of logical connections, and is configured to so create and destroy. In association with the second path 703, the second path transmitter interface 711 is responsible for, and is configured to perform, the creation and destruction of logical connections. Of course, the first and second path receiver interfaces 708, 712 are active in the creation and destruction of logical connections, although initiation is performed by the first and second path transmitter interfaces 707, 711.

Following step S12 or step S11, or following a determination at step S10 that the time out has not expired, the operation returns to step S3. Here, at least one more network payload packet is moved to the buffer for transmission.

It will be understood from the above that, whilst there is more data (in the form of network payload packets) to be transmitted, the number of logical connections 18 is managed such that the correct number of logical connections 18 are available to send the data. However, this is achieved without maintaining an unnecessarily high number of logical connections 18. In particular, it is checked regularly whether there are excess logical connections 18 and any excess connections detected are then destroyed. In particular, the check for excess connections is made in this example every time that an acknowledgement is noted at step S9 to have been received. Instead of destroying all the excess connections in one operation, any excess connections detected may be removed one at a time. That is, one excess connection may be removed each time the operation performs the step S13. This can result in a number of (one or more) spare logical connections being held in reserve for use should the transmitter 707, 711 require them in response to a change in the conditions of the path 5, 702, 703. Because the time and compute resource required to create a logical connection is greater than to destroy a logical connection, destroying the excess logical connections one at a time may utilise fewer system resources.

However, for a path 5, 702, 703 that is in a relatively steady condition and where data flow into the local bridge 3 is relatively steady, the number of logical connections that are in existence changes relatively infrequently. If the path 5, 702, 703 remains stable, then the number of logical connections decreases to the optimum level whichever of the options for destroying excess logical connections is used.

Figure 6:
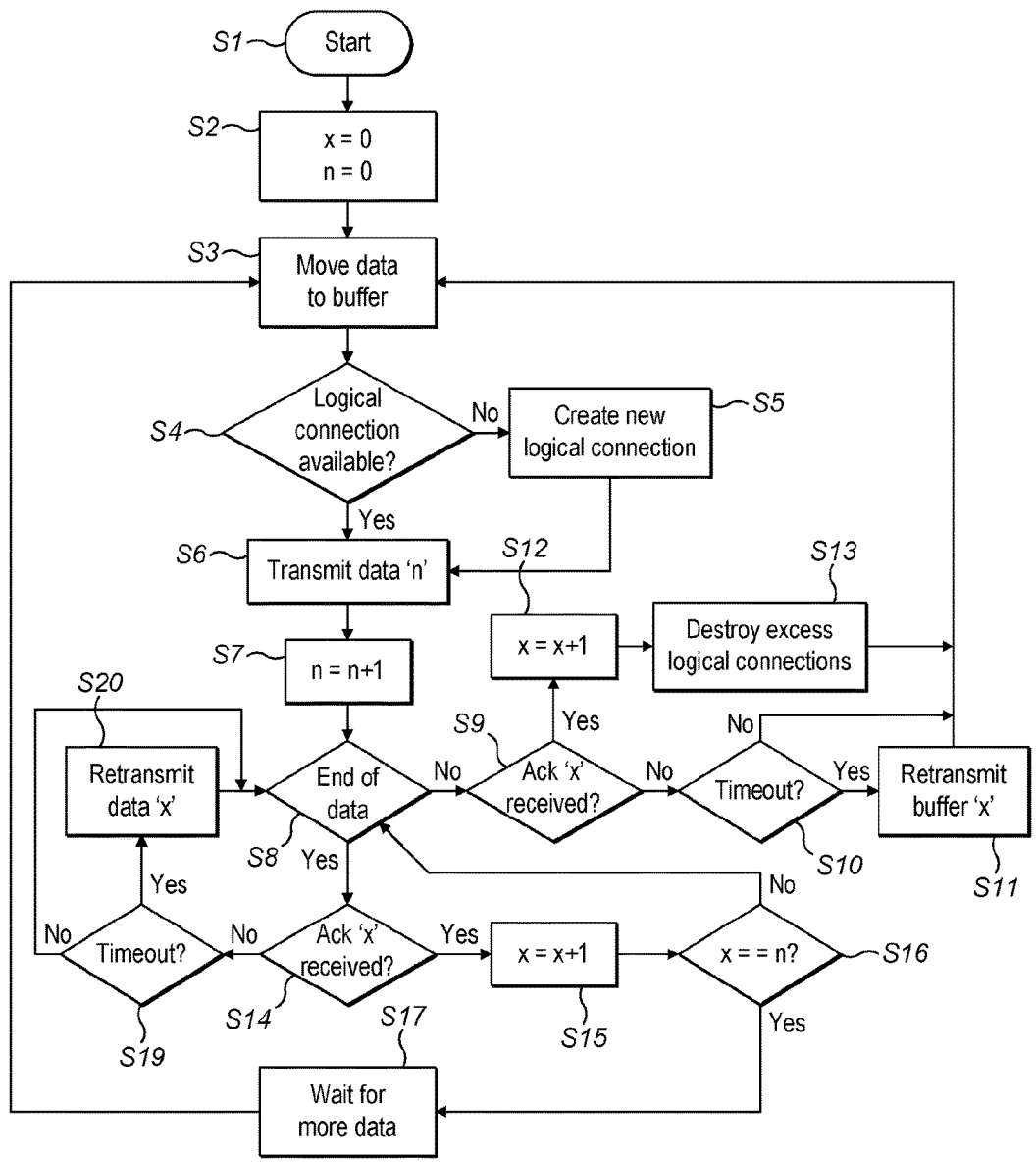
FIG. 6 is a flowchart illustrating a method of transmitting data between a transmitter and a receiver according to embodiments of the present specification, and is an alternative to the method of FIG. 4.

A consequence of the so far described aspects of the operation of FIG. 6 is that the number of logical connections 18 that are in existence at any given time is optimal or near optimal for the path 5. In particular, the number of logical connections 18 is sufficiently high to allow transmission of all of the data that needs to be transmitted but is no higher than is needed for this, or at least excess logical connections 18 are destroyed frequently so as to avoid the number of logical connections 18 being higher than needed for a significant proportion of overall time. This provides optimal performance for the transfer of data over the path 5, 702, 703 but without wasting memory etc. resources on logical connections that are not needed.

When all of the data from the buffer 14 has been transmitted (i.e. when all of the network transfer packets have been transmitted), whether or not it has all been acknowledged, step S8 produces a positive result. In this event, the operation proceeds to step S14, where it is determined whether an acknowledgement for network transfer packet x has been received. If it is determined that an acknowledgment for network transfer packet x has been received, the value of x is incremented at step S15. Next, at step S16 it is determined whether the value of x is equal to the value of n. Because x is a count of acknowledgements and n is a count of network payload packets, this amounts to an assessment as to whether acknowledgements for all of the transmitted network transfer packets have been received. On a negative determination, indicating that not all acknowledgements have been received, the operation returns to step S8, where it is again determined whether it is the end of the data in the buffer. Upon reaching step S8 from step S16 without any more data having been received at the buffer, the operation proceeds again to step S14. The loop of steps S8, S14, S15 and S16 causes the operation to monitor for acknowledgment of transmitted network transfer packets without sending more data.

If at step S14 it is determined that an acknowledgement for network transfer packet x has not been received, it is determined at step S19 whether a timeout for the network transfer packet x has occurred. If a timeout has not occurred, the operation returns to step S8. If a timeout has occurred, the network transfer packet x is retransmitted at step S20.

The retransmission steps S11 and S20 ensure that network transfer packets for which an acknowledgement has not been received are retransmitted. Moreover, they are continued to be retransmitted until receipt of the network transfer packets has been acknowledged by the remote bridge 14.

Once step S16 determines that all acknowledgements have been received, the operation proceeds to step S17. Here, the bridge 3 waits for more data to be received. Once it is received, the operation proceeds to step S3, where the data is moved to the buffer 14 for transmission.

Operation of the dispatcher 704 in the system of FIG. 3, which includes two paths 702, 703, will now be described with reference to FIG. 7.

The operation starts at step S1. At step S2, it is determined by the dispatcher 704 whether there is data in the buffer and indicated by the cache 706 as being required to be transmitted. On a negative determination, at step S3 the dispatcher 706 waits for data to be added to the cache 706. Once data for transmission is determined to be in the input buffer under management of the cache 706, the operation progresses to step S4.

At step S4, the dispatcher 704 detects the one of the paths 702, 703 that has the greatest need for data. This can be achieved in any suitable way.

For instance, the dispatcher 704 may use information supplied by the first and second path transmit AI modules 709 and 713 to determine the path that has the greatest need for data. In particular, the dispatcher 704 may determine based on information supplied by the first and second path AI transmitter modules 709, 713 which of the paths 702 and 703 has the greatest need for data. This requires the AI modules 709, 713 to be configured to calculate and provide relevant information.

In providing information to assist the dispatcher 704 to determine which of the paths 702, 703 has the greatest need for data, the AI transmitter modules 709, 713 perform a number of calculations. In particular, the AI transmitter modules 709, 713 calculate some transmission parameters including packet loss, latency and speed (in terms of bytes per second). Packet loss is calculated by counting network payload packets for which acknowledgements were not received (within a timeout window) within a given time period, and calculating the ratio of lost network payload packets to successfully transmitted network payload packets. The latency is calculated by calculating the average time between a network payload packet being transmitted and the acknowledgement for that network payload packet being received, using timing information provided by the transmit interfaces 707, 711. Speed of the physical path 5, 702,703 is determined by determining the quantity of data that is successfully transmitted in a time window, of for instance 1 second. Times for which there was no data (no network payload packets) to transmit may be excluded from the path speed calculation, so the measured path speed relates only to times when data was being transmitted.

On the basis of these measured parameters, the AI transmitter modules 709, 713 calculate, for their respective path 702, 703, a number of bytes that are required to be put onto the path per unit time (e.g. per second). This is calculated by multiplying the bandwidth in MB/s of the physical path by the current latency value in seconds At a particular moment in time, the AI transmitter modules 709, 713 are able to determine the quantity of data (in bytes) that has been sent but for which acknowledgements have not yet been received. This data can be termed data that is in flight. Data that is in flight must remain in the transmit buffer, as managed by the logical connection, but once an acknowledgement for the data is received then the corresponding memory for the transmit buffer can be reallocated.

Either the AI transmitter modules 709, 713 can report quantity of data in flight to the dispatcher 704 at predetermined times our statuses such as the last byte of data of the data segment has been transmitted, or else the dispatcher 704 can request that the AI transmitter modules 709, 713 provide quantity of data in flight information. In either case, the dispatcher 704 is provided with quantity of data in flight information from the AI transmitter modules 709, 713 at times when this information is needed by the dispatcher in order to make an assessment as to which path 702, 703 has the greatest need for data. The same applies to path speed information, as calculated by the AI transmitter modules 709, 713.

For each path, the dispatcher 704 calculates a path satisfaction value. For instance, this can be calculated by dividing the amount of data in flight (e.g. in bytes) by the path speed. Where the latency of the path is less than 1 second and where the path speed measurement has a unit of bytes per second, the path satisfaction value for a path has a value between 0 and 100. A low value indicates that the path is not highly satisfied, and has a relatively high need for data. A high value indicates that the path is relatively highly satisfied, and has a relatively low need for data.

The identification of the path with the greatest need for data is made using the path satisfaction values for the paths. This may involve simply identifying which path has the lowest path satisfaction value, and selecting that path as the path with the greatest need for data. Alternatively, the identification of the path with the greatest need for data may additionally utilise other information such as path speed or latency measured for the path 702, 703.

Once a path 702, 703 has been determined at step S4, the dispatcher 704 begins preparing to provide the transmit interface 707, 711 for the path 702, 703 with data from the data cache 706. This starts at step S5, where the value of the OTPS parameter for the path 702, 703 is fetched. The value of the parameter is fetched from the corresponding path's AI transmitter module 709, 713. The value of the OTPS parameter is calculated by the AI transmitter module 709, 713 in the manner described below with reference to FIG. 11. Since the value of the OTPS parameter is calculated separately for each of the paths 702, 703, there may be a different OTPS parameter for each of the paths 702, 703.

At step S6, the dispatcher 704 selects a first part of the next data segment in the cache 706. The part of the data segment that is selected has a length equal to the fetched value of the OPTS parameter. Where the data segment has a length that is less than or equal to the value of the OPTS parameter, the whole of the data segment is selected. Where the data segment has a length that is greater than the value of the OPTS parameter, a part of the data segment of length equal to the value of the OPTS parameter is selected.

Once a quantity of data from the dispatcher 704 has been selected for provision to the path, an IO vector for the selected data is created by the dispatcher 704, for use by the transmit interface 707, 711 of the selected path. The creation of the IO vector constitutes the provision of a transfer packet. The creation of the IO vector and thus the transfer packet is described in more detail below with reference to FIGS. 8 and 9. Briefly, the conversion of the IO vector results in an IO vector that points to a transfer packet having at maximum the same size as the size indicated by the OTPS parameter for the path which was fetched at step S5. The IO vector is later provided to the FIFO buffer (not shown) associated with the relevant path 702, 703.

After the IO vector creation at step S6, the IO vector is transferred to the selected path 702, 703, and in particular to a FIFO buffer (not shown) of the transmit interface 707, 711 of that path, at step S7. The result of step S7 is the provision, to the FIFO buffer (not shown) forming part of the transmit interface 707, 711 of the path that was detected at step S4 to have the greatest need for data, of an IO vector comprising a pointer to a transfer packet and indicating the length of the transfer packet. Moreover, the FIFO buffer of the path 702, 703 is provided with an IO vector that relates to a transfer packet having the optimum transfer packet size, or possibly a smaller size. This allows the path 702, 703, and in particular the relevant transmit interface 707, 711, to access the (whole or part of) the data segment. This is provided with the (whole or part of the) data segment in a transfer packet having at maximum the optimum transfer packet size that has been determined for the selected path, for transmission over a logical connection of the selected path 702, 703.

At step S8, it is determined whether the end of the data segment has been reached. On a positive determination, the operation returns to steps S2, where the next data segment can be retrieved and processed. On a negative determination, the operation returns to step S4. Here, the steps S4 to S7 are performed again for the next part of the data segment.

If step S4 identifies that the same path 702, 703 still has the greatest need for data, an IO vector (and transfer packet) is created for the next part of the segment with a length equal to (or possibly less than) the value of the OTPS value for that path 702, 703. The value of OTPS does not normally change between successive transfer packets for the same path 702, 703, although this does occur occasionally.

If step S4 identifies that the opposite path 702, 703 now has the greatest need for data, an IO vector (and transfer packet) is created for the next part of the segment with a length equal to (or possibly less than) the value of the OTPS value for that opposite path 702, 703. The size of this next transfer packet is dependent on the value of a different OPTS parameter (the OPTS parameter for the opposite path) so often is different to the size of the previous transfer packet.

For a data segment that is longer than the value of the OPTS parameter that is fetched at step S5 when the data segment is first processed, the transmission of the data segment may occur over two different paths 702, 703. It is not that the data segment is transmitted over both paths. Instead, different parts of the data segment are transmitted over different paths 702, 703.

Figure 8:
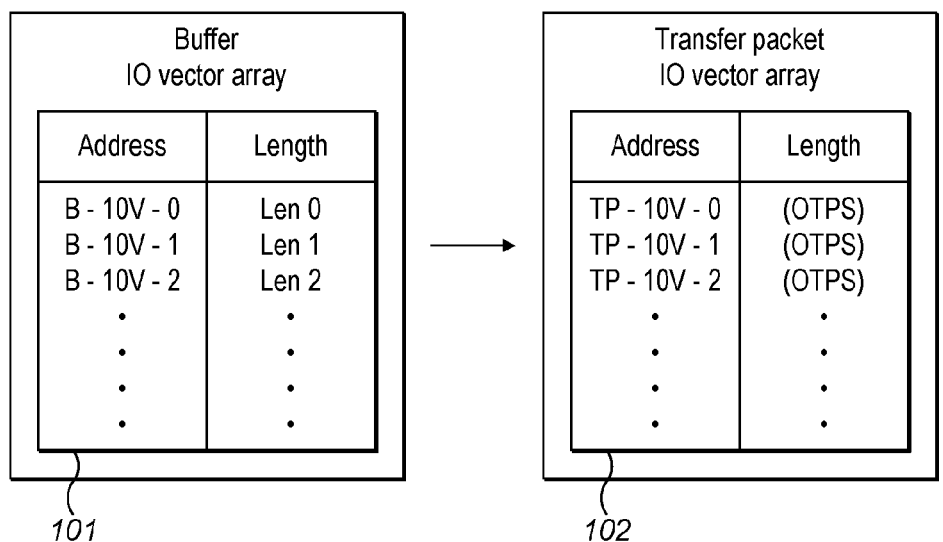
FIG. 8 is a diagram illustrating IO vector arrays before and after the performance of the operation of FIG. 7.

Referring now to FIG. 8, an IO vector array 101 for the buffer is shown on the left side of the Figure and an IO vector array 102 for the transfer packets is shown on the right side of the Figure.

The IO vector array 101 of the buffer is managed by the dispatcher 704.

Figure 9:
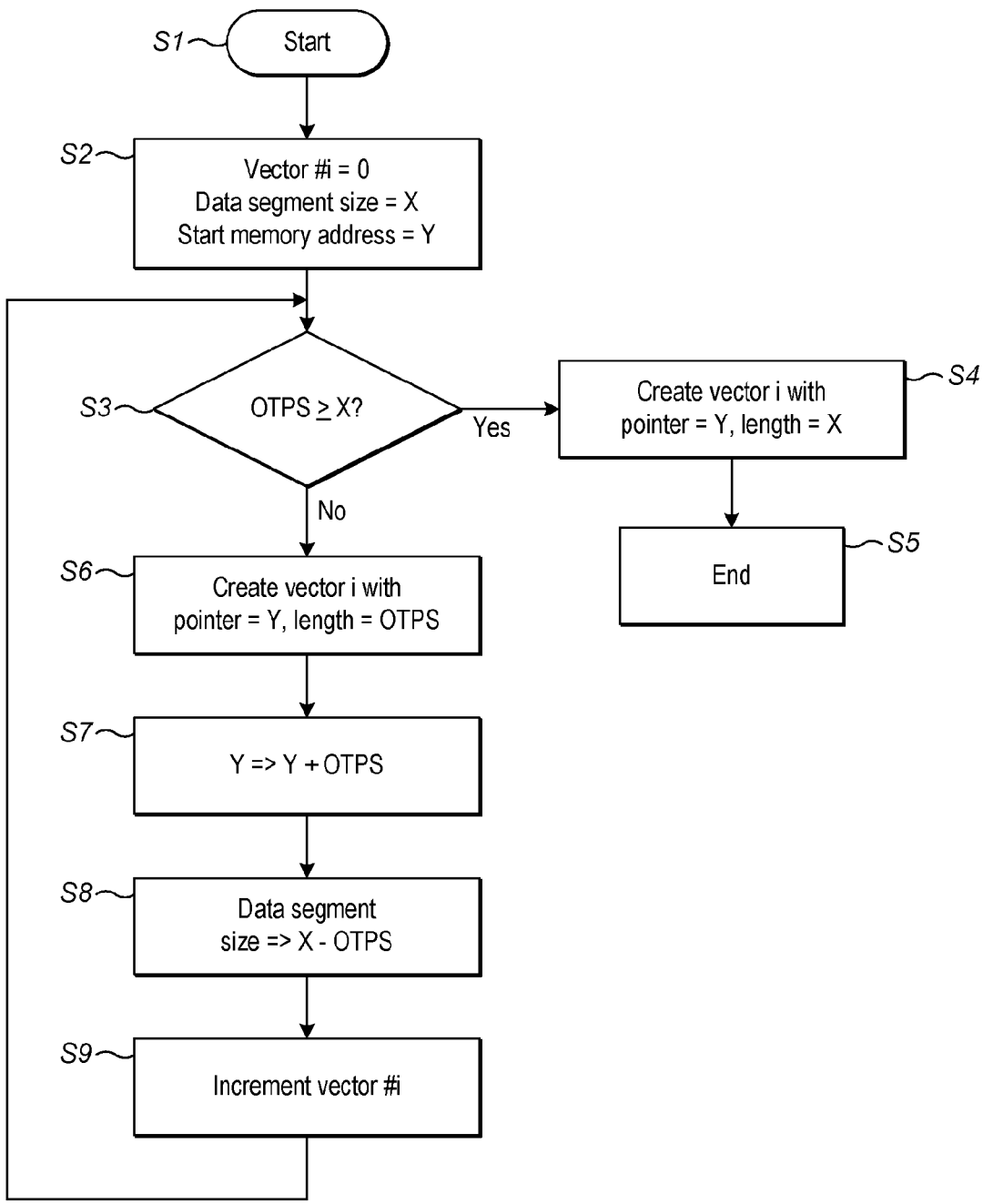
FIG. 9 is a flowchart illustrating a method of operating a dispatcher forming part of the system of FIG. 1 or FIG. 3.

Operation of the dispatcher 704 in converting the buffer IO vector array 101 to the transfer packet IO vector array 102 will now be described with reference to FIG. 9.

Operation starts at step S1. At step S2, a vector #i parameter is initialised at zero. Also, the size of the data segment is set as the value of a variable X. Additionally, the starting memory address of the data segment in the buffer is set as the value of a variable Y.

The data segment then begins to be processed at step S3. The value of the OPTS parameter for the path 702, 703 (this is the path selected at step S4 of FIG. 7) has already been fetched, in particular by action of step S5 of FIG. 7. At step S3, it is determined whether or not the value of the data segment size X is less than or equal to the value of the fetched OTPS parameter. If the data segment size X is less than or equal to the value of the OTPS parameter, this indicates that all of the data segment can fit into one transfer packet. Upon this determination, at step S4 an IO vector is created. The vector is created with a start memory address (pointer) having a value equal to the value of the parameter Y. The vector has a length field including a length parameter that is equal to the value of X, which indicates the size of the data segment. The IO vector i is then provided to the FIFO buffer in the relevant transmit interface 707, 711. The IO vector then constitutes a transfer packet, although the physical data remains in its original location (i.e. the location prior to processing by the dispatcher 704) in the buffer. Following the creation of the IO vector i and the provision of the IO vector to the FIFO buffer in step S4, the operation ends at step S5.

If at step S3 it is determined that the data segment size X is greater than the value of the OTPS parameter, the operation proceeds to step S6. Here, the dispatcher 704 creates an IO vector i. Here, the IO vector i is provided with a start memory address (pointer) having a value equal to the parameter Y. The length of the vector i is equal to the value of the OTPS parameter. As such, step S6 involves creating an IO vector that points to data of a length equal to the optimal transfer packet size and having a start address at the start of data that has not yet been processed. The IO vector i is then provided to the FIFO buffer in the relevant transmit interface 707, 711. The IO vector then constitutes a transfer packet, although the physical data remains in its original location (i.e. the location prior to processing by the dispatcher 704) in the buffer.

Following step S7, the value of the start memory address parameter Y is increased by the value of the OTPS parameter. This moves the start memory address on such as to point to data starting just after the data indicated by the IO vector i that was created in step S6.

Following step S7, at step S8 the value of the data segment size parameter X is reduced by the value of the OTPS parameter. This causes the value of the buffer size parameter X to be equal to the amount of the segment data that remains to be indicated by a transfer packet IO vector in the IO vector array 102.

Following step S8, at step S9 the vector #i value is incremented. As such, when a vector is subsequently created at step S6 or step S4, it relates to a higher vector number.

It will be appreciated that the check at step S3 results in the loop formed by steps S6 to S9 being performed until the amount of data remaining in the buffer is less than or equal to the value of the OTPS parameter, at which time the remaining data is provided into a final IO vector i at step S4.

Figure 7:
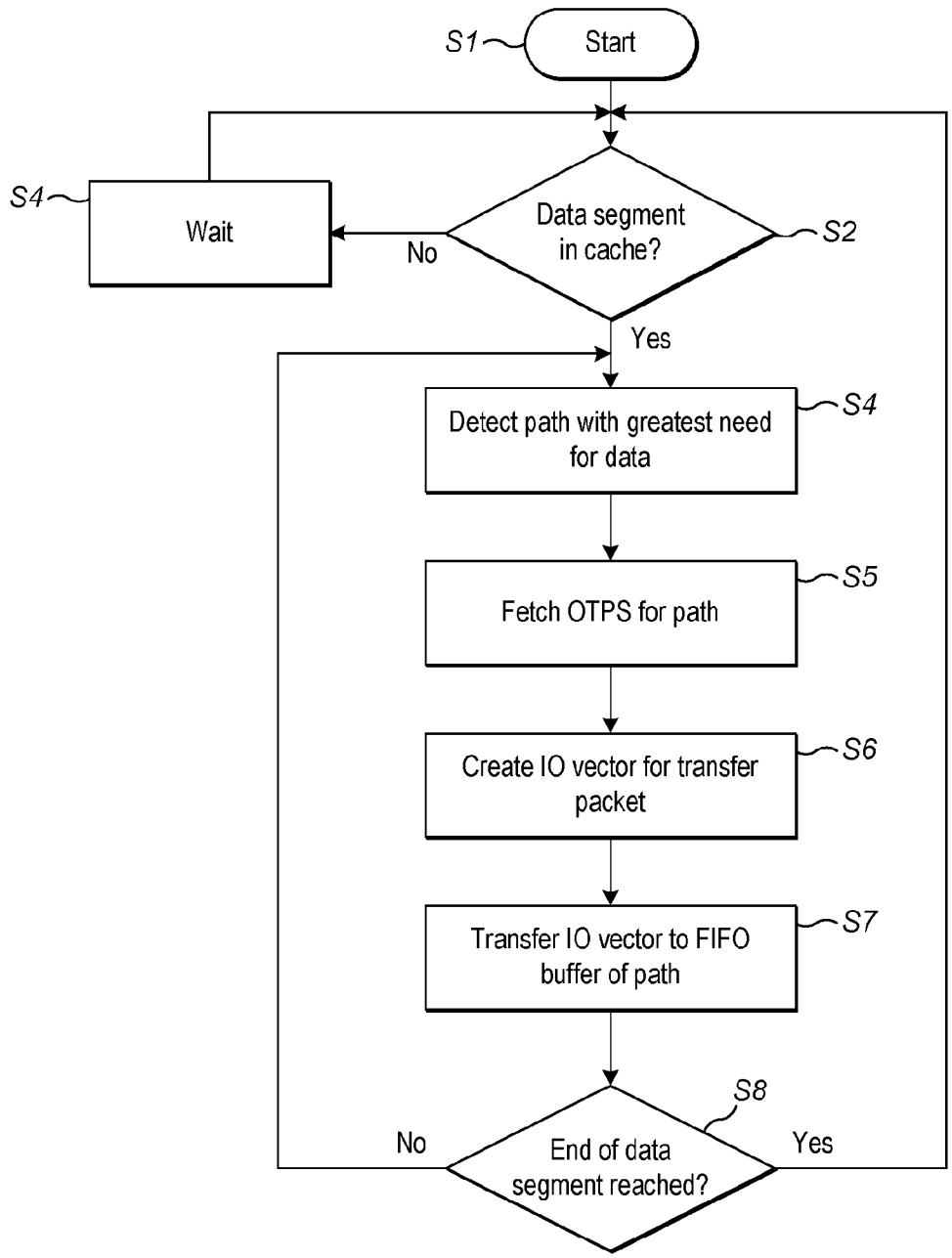
FIG. 7 is a flowchart illustrating a method of grouping input packets into transfer packets according to embodiments of the specification.

The IO vectors created at steps S4 and S6 for different parts of the same data segment may be created for different ones of the paths 702, 703, according to the determinations made at step S4 of FIG. 7. Also, the lengths of the resulting transfer packets may differ, because they are dependent on the values of the OPTS parameter(s) at the time of fetching the OPTS parameter for the path(s) 702, 703 at step S5 of FIG. 7 as well as because the last part of a data segment will normally be shorter that the value of the OTPS parameter. As such, the transfer packets of the resulting IO vector array may have a number of different lengths.

The resulting transfer packet IO vector array 102 is then provided to the FIFO buffer(s) of the relevant transmit interface(s) 707, 711 of the relevant path(s) 702, 703. Depending on the determinations as to which path 702, 703 had the greatest need for data at step S4 of FIG. 7, different ones of the IO vectors in the transmit packet IO vector array may be included in different FIFO buffers in different transmit interfaces 707, 711. The transmit interface(s) 707, 711 then use the IO vectors in their respective FIFO buffer to retrieve the parts of the data segment (the transfer packets) from the data buffer 704 and transmit them over the logical connections that are provided by the respective path 702, 703.

When the transmit interface 707, 711 is ready to transmit data on the next logical connection, the transmit interface 707, 711 looks to the next IO vector in its FIFO buffer. From this IO vector, it extracts the memory address of the data buffer 704 where the data to be transmitted begins and extracts the related transfer packet length. The transmit interface 707, 711 then extracts the corresponding data from the data buffer 704 and transmits it over the next logical connection on its path 702, 703. Once the transmit interface 707, 711 receives an acknowledgement for that transfer packet, this is notified to the dispatcher 704 so that the corresponding memory in the data buffer can be reallocated.

The conversion of the IO vector arrays described with reference to FIGS. 8 and 9 results in the sending of at least some transfer packets having a desired length (equal to the value of the OTPS parameter) without requiring the unnecessary copying of data. This is achieved because the IO vectors in the transfer packet IO vector array 102 include address and length information that directly relates to the transfer packets. Thus, the number of memory read and write operations is minimised, whilst at the same time allowing high flexibility in the receiving of input data into the local bridge 3 and the sending of transfer packets of a desired length to the remote bridge 4. Of course, some transfer packets are created with a length that is less than the value of the OTPS parameter. Once a path 702, 703 has been determined at step S4, the dispatcher 704 begins preparing to provide the transmit interface 707, 711 for the path 702, 703 with data from the data cache 706. This starts at step S5, where the value of the OTPS parameter for the path 702, 703 is fetched. The value of the parameter is fetched from the corresponding path's AI transmitter module 709, 713. The value of the OTPS parameter is calculated by the AI transmitter module 709, 713 in the manner described below with reference to FIG. 11 Since the value of the OTPS parameter is calculated separately for each of the paths 702, 703, there may be a different OTPS parameter for each of the paths 702, 703.

At step S6, the dispatcher 704 selects a first part of the next data segment in the cache 706. The part of the data segment that is selected has a length equal to the fetched value of the OPTS parameter. Where the data segment has a length that is less than or equal to the value of the OPTS parameter, the whole of the data segment is selected. Where the data segment has a length that is greater than the value of the OPTS parameter, a part of the data segment of length equal to the value of the OPTS parameter is selected.

Once a quantity of data from the dispatcher 704 has been selected for provision to the path, an IO vector for the selected data is created by the dispatcher 704, for use by the transmit interface 707, 711 of the selected path. The creation of the IO vector constitutes the provision of a transfer packet. The creation of the IO vector and thus the transfer packet is described in more detail below with reference to FIGS. 8, 9 and 10. Briefly, the conversion of the IO vector results in an IO vector that points to a transfer packet having at maximum the same size as the size indicated by the OTPS parameter for the path which was fetched at step S5. The IO vector is later provided to the FIFO buffer (not shown) associated with the relevant path 702, 703.

After the IO vector creation at step S6, the IO vector is transferred to the selected path 702, 703, and in particular to a FIFO buffer (not shown) of the transmit interface 707, 711 of that path, at step S7. The result of step S7 is the provision, to the FIFO buffer (not shown) forming part of the transmit interface 707, 711 of the path that was detected at step S4 to have the greatest need for data, of an IO vector comprising a pointer to a transfer packet and indicating the length of the transfer packet. Moreover, the FIFO buffer of the path 702, 703 is provided with an IO vector that relates to a transfer packet having the optimum transfer packet size, or possibly a smaller size. This allows the path 702, 703, and in particular the relevant transmit interface 707, 711, to access the (whole or part of) the data segment. This is provided with the (whole or part of the) data segment in a transfer packet having at maximum the optimum transfer packet size that has been determined for the selected path, for transmission over a logical connection of the selected path 702, 703.

At step S8, it is determined whether the end of the data segment has been reached. On a positive determination, the operation returns to steps S2, where the next data segment can be retrieved and processed. On a negative determination, the operation returns to step S4. Here, the steps S4 to S7 are performed again for the next part of the data segment.

If step S4 identifies that the same path 702, 703 still has the greatest need for data, an IO vector (and transfer packet) is created for the next part of the segment with a length equal to (or possibly less than) the value of the OTPS value for that path 702, 703. The value of OTPS does not normally change between successive transfer packets for the same path 702, 703, although this does occur occasionally.

If step S4 identifies that the opposite path 702, 703 now has the greatest need for data, an IO vector (and transfer packet) is created for the next part of the segment with a length equal to (or possibly less than) the value of the OTPS value for that opposite path 702, 703. The size of this next transfer packet is dependent on the value of a different OPTS parameter (the OPTS parameter for the opposite path) so often is different to the size of the previous transfer packet.

For a data segment that is longer than the value of the OPTS parameter that is fetched at step S5 when the data segment is first processed, the transmission of the data segment may occur over two different paths 702, 703. It is not that the data segment is transmitted over both paths. Instead, different parts of the data segment are transmitted over different paths 702, 703.

The operation of the dispatcher 704 in converting the buffer IO vector array 101 to the transfer packet IO vector array 102 will now be described with reference to FIG. 9.

Operation starts at step S1. At step S2, a vector #i parameter is initialised at zero. Also, the size of the data segment is set as the value of a variable X. Additionally, the starting memory address of the data segment in the buffer is set as the value of a variable Y.

The data segment then begins to be processed at step S3. The value of the OPTS parameter for the path 702, 703 (this is the path selected at step S4 of FIG. 7) has already been fetched, in particular by action of step S5 of FIG. 7. At step S3, it is determined whether or not the value of the data segment size X is less than or equal to the value of the fetched OTPS parameter. If the data segment size X is less than or equal to the value of the OTPS parameter, this indicates that all of the data segment can fit into one transfer packet. Upon this determination, at step S4 an IO vector is created. The vector is created with a start memory address (pointer) having a value equal to the value of the parameter Y. The vector has a length field including a length parameter that is equal to the value of X, which indicates the size of the data segment. The IO vector i is then provided to the FIFO buffer in the relevant transmit interface 707, 711. The IO vector then constitutes a transfer packet, although the physical data remains in its original location (i.e. the location prior to processing by the dispatcher 704) in the buffer. Following the creation of the IO vector i and the provision of the IO vector to the FIFO buffer in step S4, the operation ends at step S5.

If at step S3 it is determined that the data segment size X is greater than the value of the OTPS parameter, the operation proceeds to step S6. Here, the dispatcher 704 creates an IO vector i. Here, the IO vector i is provided with a start memory address (pointer) having a value equal to the parameter Y. The length of the vector i is equal to the value of the OTPS parameter. As such, step S6 involves creating an IO vector that points to data of a length equal to the optimal transfer packet size and having a start address at the start of data that has not yet been processed. The IO vector i is then provided to the FIFO buffer in the relevant transmit interface 707, 711. The IO vector then constitutes a transfer packet, although the physical data remains in its original location (i.e. the location prior to processing by the dispatcher 704) in the buffer.

Following step S7, the value of the start memory address parameter Y is increased by the value of the OTPS parameter. This moves the start memory address on such as to point to data starting just after the data indicated by the IO vector i that was created in step S6.

Following step S7, at step S8 the value of the data segment size parameter X is reduced by the value of the OTPS parameter. This causes the value of the buffer size parameter X to be equal to the amount of the segment data that remains to be indicated by a transfer packet IO vector in the IO vector array 102.

Following step S8, at step S9 the vector #i value is incremented. As such, when a vector is subsequently created at step S6 or step S4, it relates to a higher vector number.

It will be appreciated that the check at step S3 results in the loop formed by steps S6 to S9 being performed until the amount of data remaining in the buffer is less than or equal to the value of the OTPS parameter, at which time the remaining data is provided into a final IO vector i at step S4.

The IO vectors created at steps S4 and S6 for different parts of the same data segment may be created for different ones of the paths 702, 703, according to the determinations made at step S4 of FIG. 7. Also, the lengths of the resulting transfer packets may differ, because they are dependent on the values of the OPTS parameter(s) at the time of fetching the OPTS parameter for the path(s) 702, 703 at step S5 of FIG. 7 as well as because the last part of a data segment will normally be shorter that the value of the OTPS parameter. As such, the transfer packets of the resulting IO vector array may have a number of different lengths.

The resulting transfer packet IO vector array 102 is then provided to the FIFO buffer(s) of the relevant transmit interface(s) 707, 711 of the relevant path(s) 702, 703. Depending on the determinations as to which path 702, 703 had the greatest need for data at step S4 of FIG. 7, different ones of the IO vectors in the transmit packet IO vector array may be included in different FIFO buffers in different transmit interfaces 707, 711. The transmit interface(s) 707, 711 then use the IO vectors in their respective FIFO buffer to retrieve the parts of the data segment (the transfer packets) from the data buffer 704 and transmit them over the logical connections that are provided by the respective path 702, 703.

When the transmit interface 707, 711 is ready to transmit data on the next logical connection, the transmit interface 707, 711 looks to the next IO vector in its FIFO buffer. From this IO vector, it extracts the memory address of the data buffer 704 where the data to be transmitted begins and extracts the related transfer packet length. The transmit interface 707, 711 then extracts the corresponding data from the data buffer 704 and transmits it over the next logical connection on its path 702, 703. Once the transmit interface 707, 711 receives an acknowledgement for that transfer packet, this is notified to the dispatcher 704 so that the corresponding memory in the data buffer can be reallocated.

The conversion of the IO vector arrays described with reference to FIGS. 8 and 9 results in the sending of at least some transfer packets having a desired length (equal to the value of the NTS parameter) without requiring the unnecessary copying of data. This is achieved because the IO vectors in the transfer packet IO vector array 102 include address and length information that directly relates to the transfer packets. Thus, the number of memory read and write operations is minimised, whilst at the same time allowing high flexibility in the receiving of input data into the local bridge 3 and the sending of transfer packets of a desired length to the remote bridge 4. Of course, some transfer packets are created with a length that is less than the value of the NTS parameter.

To optimise the flow of data across the paths 702, 703, the IO vector size for each transmit interface should equal the number of active logical connections multiplied by the RWS of each active logical connect. Any IO vector size larger than this would require a number of logical connections to be used more than once before the IO vector could be released and another one loaded. This would leave active logical connections without data to transmit and thus would result in inefficiency and a loss of performance as there would be a delay before loading the new IO vector data. In a similar manner, a IO vector size that is too small would have a similar but lesser effect.

Those persons familiar with the workings of TCP/IP protocol will understand that each of the multiple logical connections 12-1~12-*n* that is used simultaneously to transfer data between bridges 3, 4 could have a different value for the RWS parameter from another and this may change as the data transfers progress over time. The value of the RWS parameter for a logical connection is determined by the receiver 4 based on packet loss, system limitations including available memory, a ramp up size setting and a maximum RWS size setting. In addition, depending on the network conditions detected by the AI modules 707, 711, the number of logical connection may also vary in a response to changes in latency or any other network event.

Figure 10:
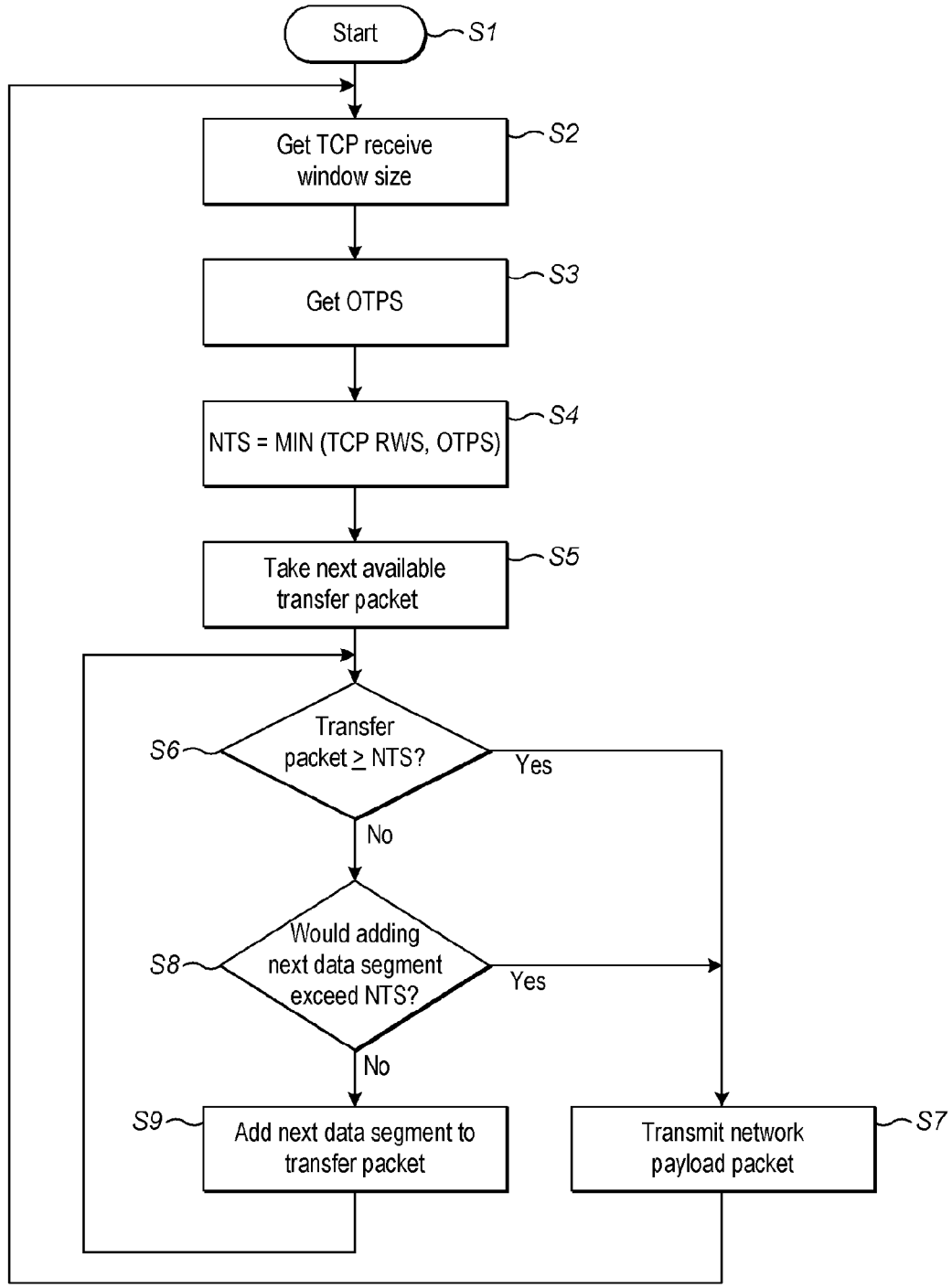
FIG. 10 is a flowchart illustrating a method of operating a dispatcher forming part of the system of FIG. 1 or FIG. 3.

The operation of FIG. 10 will now be described. The operation of FIG. 10 is performed by the transmit interfaces 707, 711 of the local bridge 3. The operation of FIG. 10 results in the creation and transmission of network payload packets that have a size (length) that provides good (possibly maximum) performance of the paths 702, 703. This is achieved based on segmented input data where the lengths of the data segments received as input data vary.

The operation of FIG. 10 is performed by each transmit interface 707, 711. Additionally, it is performed by each transmit interface 707, 711 independently of the other transmit interface. Each transmit interface 707, 711 has different transfer packets in its FIFO buffer, and the transmit interfaces may have different OTPS parameters.

The operation starts at step S1. At step S2, the initial NTS is calculated by using a representative sample TCP receive window size (RWS) from a logical connection related to the path 702, 703 in question. This is obtained in the usual way together with the number of active logical connections.

At step S3 an optimum packet transfer size parameter (OPTS) is obtained. This parameter is calculated having regard to actual transmission conditions on the physical path and is explained below in relation to Figure ii. The optimum packet transfer size parameter relates to what is determined to be an ideal size for network payload packets, based on measured performance of the path 5, 702, 703 in real time or near real time.

The value of the TCP RWS parameter changes occasionally, and the frequency of change depends on the stability of the physical network path(s). A function within the TCP protocol tries to increase the value of the TCP RWS parameter as part of its own program to improve the efficiency of the data transfer process. However, if a transmitter operating according to the TCP protocol encounters lost packets or timeouts in transmissions, it reduces the value of the TCP RWS parameter. This contributes to improving the reliability of the transmission process. Therefore it is important to the overall efficiency of the transfers between the bridges 3, 4 that the size of the transfer packets passed for transmission under the TCP protocol is optimised for the path and the value of the TCP RWS parameter. The value of the optimum packet transfer size (OPTS) parameter also changes depending on the conditions and stability of the path 702, 703. Typically, the values of the OTPS parameters for the paths 702, 703 does not change for every transfer packet, but might change on average some tens, hundreds or thousands of transfer packets, depending on how often there are relevant changes detected on the physical path. The calculation of the value of the OTPS parameter for a path 702, 703 is described below with reference to Figure ii.

Referring again to FIG. 10, at step S4 the minimum of the values of the TCP RWS and the OPTS parameters is calculated. The minimum is the smallest (lowest) one of the values. The minimum value calculated at step S4 provides a value for a network transfer size (NTS) parameter. This parameter is not a TCP parameter, although its value may be dictated by the TCP RWS parameter in some instances (in particular where the value of the TCP RWS parameter is lower than the value of the OPTS parameter).

At step S5, the next available transfer packet is taken from the FIFO buffer, and this is then handled as the current transfer packet. The size of the packet has previously been determined by an earlier process and is included within the IO vector, which constitutes metadata associated with the transfer packet.

At step S6, the size of the current transfer packet is compared to the value of the NTS parameter that was calculated at step S4. If the size of the transfer packet is greater than or equal to the NTS value, the transfer packet is denoted as a network payload packet and is transmitted as a network payload packet at step S7.

At step S8, the IO vector relating to the next transfer packet in the buffer is examined, and the size of the next transfer packet is noted. It is then determined whether adding the next transfer packet in the buffer to the existing packet would exceed the value of the NTS parameter. If the value would be exceeded, that is if the sum of the sizes (lengths) of the current transfer packet and the next transfer packet exceeds the minimum of the TCP RWS and the OPTS parameters, the current transfer packet is denoted as a network payload packet and transmitted as a network payload packet at step S7. Here, the next transfer packet has not been included in the transfer packet.

If the value of the NTS parameter would not be exceeded by concatenating the two transfer packets together, the operation proceeds to step S9. Here, the next transfer packet is taken and is concatenated with (or added to) the previous packet so as to form a concatenated transfer packet. This concatenated transfer packet is then treated as a single transfer packet when performing step S6 and step S8. The concatenated transfer packet of course has more than one header. The length of the concatenated transfer packet is equal to the length of the payloads of the included transfer packets added to the length of the headers of the included transfer packets.

When a concatenated transfer packet has been created at step S9, this is handled as a current transfer packet at step S5 in the same way as described above. The concatenated transfer packet may become larger, if the addition of the next transfer packet in the FIFO buffer would not result in the value of the NTS parameter being exceeded, and otherwise it is denoted as and transmitted as a network payload packet.

After the network payload packet has been transmitted at step S7, the operation returns to step S2. At steps S2 and S3, the TCP RWS and OPTS parameter values for the relevant path 702, 703 are again obtained, and these values are used when determining the new value of the NTS parameter at step S4. The value of the NTS parameter may change between consecutive performances of the step S4, but usually it does not change between consecutive network payload packets.

It will be appreciated that steps S2 to S4 need not be performed every time that a network payload packet is transmitted. Instead, these steps may be performed periodically, in terms of at fixed time intervals or in terms of a fixed number of network payload packets. Alternatively, they may be performed only if it is determined that the value of the TCP RWS parameter has changed or the value of the OPTS parameter has changed, as may occur when there is a change with the physical path such as a change in the packet loss rate, changes in round trip times, packet time out parameter values, path drops, etc.

The result of steps S5 to S8 is the transmission of multiple network payload packets, each of which may include one or multiple transfer packets from the FIFO buffer. Moreover, the result of the performance of the steps is such that the size of the transmitted network payload packets is less than or equal to the smallest of the TCP RWS and OPTS parameters. The size of the transmitted network payload packets never exceeds either of the TCP RWS and OPTS parameters.

Moreover, this is achieved without requiring any reordering of the data segments from the buffer; instead they are sent to the FIFO buffers of the transmit interfaces 707, 711 in the order in which they are received, and are transmitted in network payload packets in that same order or possibly in a very slightly different order.

Figure 11:
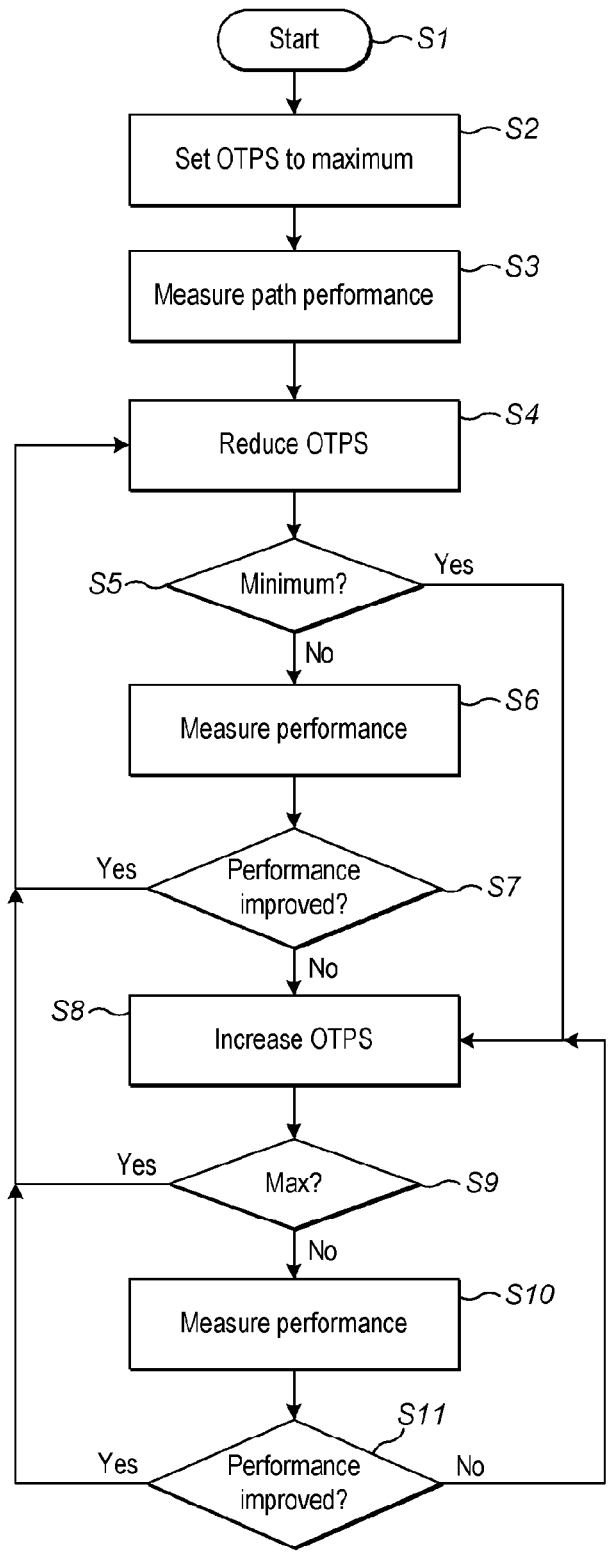
FIG. 11 is a flowchart illustrating a method of calculating a transfer packet size parameter according to embodiments of the specification.

The calculation of the optimum packet transfer size (OPTS) parameter will now be described with reference to Figure ii. The operation of FIG. 11 is performed by the transmit artificial intelligence (AI) modules 709, 713 in the local bridge 3. The operation of FIG. 11 is performed by each transmit AI module 709, 713. Additionally, it is performed by each transmit AI module 709, 713 independently of the other transmit AI module 709, 713. Each transmit interface 707, 711 is connected to a different path 702, 703, and different OTPS parameters might be calculated for the different paths at a given time.

The operation starts at step S1. At step S2, a maximum transmit size is set as the value of the OTPS parameter. Initially, the value of the maximum transmit size is determined by system constraints, such as available memory and the maximum allowed size of the TCP receive window size, as indicated by the value of the maximum TCP RWS parameter as defined by the operating system. The value of the OPTS parameter may initially for instance be set to a maximum transit size that is equal to the value of the TCP RWS parameter. The value of the OPTS parameter may initially be set to a maximum transit size that is equal to the value of sum of the TCP RWS parameters for the logical connections, or the product of the number of logical connections and a TCP RWS parameter.

At step S3, the performance of the path is measured. This involves the transmission of network payload packets by the transmit interface 707, 711 according to the operation shown in FIG. 10 using a value of OPTS at the maximum value set in step S2 of FIG. 11. Transmission is allowed to be performed for a period of time before performance is measured, so as to allow the path 702, 703 to stabilise. The path may need time to stabilise because intermediate devices (not shown) within the path 702, 703 and other factors affect initial stability. After allowing some time for the path 702, 703 to stabilise, the performance of the path is measured.

Performance is measured here in terms of throughput, for instance in bytes per second. Performance is measured over a predetermined period of time or quantity of data transferred, or both. The predetermined quantity of data may be in terms of bytes, or network payload packets. Time may be in terms of seconds or minutes.

Following step S3, at step S4 the value of OPTS is reduced. The reduction may be by a fixed amount, percentage or a division of the maximum transfer size, or it may be by a dynamic amount dependent on the measured performance. For instance, in a situation in which the value of the OPTS parameter is 1 MB, the value of the OPTS parameter may be reduced by 100 KB, 25 percent or OPTS/2 (so, 512 KB).

At step S5 it is determined whether the value of OPTS, following reduction at step S4, is at the minimum value. The minimum value may be predetermined and may take any suitable value. This minimum value may be defined by the type of storage interface such as 13-1~13-*n*, which in the case of a Fibre Channel interface is 2 kB (the payload size within a Fibre Channel packet). Other storage interface protocols such as iSCSI, SAS and SCSI give rise to different minimum values for the value of the OPTS parameter. The type of storage peripheral device forming part of the SAN 1,2 may dictate the minimum value of the OTPS parameter. For instance, tape devices have very different cache and block size differences to those of disk drives. The minimum value for OPTS may for instance be one or two orders of magnitude below the maximum OPTS value. The transmit interface 707, 711 in the local bridge 3 then sends network payload packets using the reduced OPTS value, and the performance of the path with the reduced OPTS value is measured at step S6. Performance measurement is completed in the same way as described above with reference to step S3 and over the same time period or quantity of data. The commencement of measurement of performance of the path may be delayed to allow some time for the path 702, 703 to stabilise.

After the performance has been measured, it is determined at step S7 whether the performance has improved. The performance will be determined to have improved if the measured performance at step S6 is greater than the performance measured at the previous instance of measurement. If it is determined that performance has improved, the operation returns to step S4, where the value of OPTS is again reduced.

Once it is determined at step S7 that performance has not improved, at step S8 the value of the OPTS parameter is increased. The amount of the increase may be fixed and predetermined, or it may be dynamic dependent on the change in performance detected.

Following step S8 it is determined whether the value of OPTS is equal to the maximum value. If it is, then the value is reduced at step S4. If the value of OPTS is not at the maximum value, at step S10 the performance is again measured. At step S11 it is then determined whether the performance has improved. If the performance has improved, following increase of the value of OPTS, the value is again increased at step S8. If the performance is not improved, the value of OPTS is reduced at step S4.

It will be appreciated that the operation of FIG. 11 results in the measurement of performance of the transmission of data over the path 5 having regard to a particular OPTS size, changing the value of OPTS in one direction (either increasing it or decreasing it) until the performance is determined not to be improved, and then changing the value of OPTS in the other direction (i.e. decreasing it or increasing it respectively).

Once the optimum transfer packet size is reached and if the conditions on the path 5 are stable, the performance will be seen to alternate between increasing and decreasing for consecutive measurements, as the OPTS is firstly incremented then decremented and then incremented again etc.

The method of FIG. 11 results in the provision of a value of OPTS that provides the optimum performance of the path at a given time. Moreover, this is achieved taking into account the optimisation of the transfers to and from the server and the peripheral device, e.g., the SAN 1 and the SAN 2. Therefore, it is the complete data path from the server to the peripheral devices that is optimized. Moreover, this is done solely on the basis of measured performance, rather than any theoretical or looked-up performance. As such, the value of the OPTS parameter that is provided is the value that provides the optimum performance having regard to the path conditions without it being necessary to consider the path conditions and without it being necessary to make any assumptions as to how best to transfer data having regard to the path conditions.

As mentioned above, each of the paths 702, 703 includes multiple logical connections. Each of the paths 702, 703 has one physical ports, and in most cases more than one port. These ports and logical connections may be provided as described above with reference to FIGS. 1 and 3. Alternatively, they may be provided as described above with reference to FIG. 6. In either case, the number of logical connections is selected so as to provide suitable performance of data transfer over the respective path, 702, 703. In the case of the method of FIG. 6, the number of logical connections is managed so as to optimise performance.

The first path transmitter AI module 709 performs the optimum packet transfer size calculation that is described above in reference to FIG. 11. As such, the first path transmitter AI module 709 calculates a value for OPTS that is optimum having regard to the transmission conditions on the first path 702.

Similarly, the second path transmitter AI module 713 performs the OPTS calculation operation of FIG. 11 in order to calculate an OPTS value that provides optimum performance of data communication over the second path 703.

As such, each transmitter AI module uses measured performance of its respective path 702, 703 to calculate parameters used to transmit data over its respective path 702, 703.

Each transmitter AI module 709, 713 operates independently. Each transmitter AI module 709, 713 optimises data transmission over its respective path 702, 703 utilising all of the information available to it, including acknowledgements from the first path receive interfaces 708, 712 of the remote bridge 4 etc.

Each transmitter AI module 709, 713 results in (through control of the dispatcher 704) a quantity of data (equating to the value of the the OTPS parameter) to be taken from the cache 706 by its respective transmit interface 707, 711 according to the demands of the path, as determined by the transmitter AI module 709, 713. This is described in detail above with reference to FIG. 7.

Each transmitter AI module 709, 713 operates independently of the other transmitter AI module 709, 713. As such, each transmitter AI module 709, 713 is unaware of the operation of the other transmitter AI module 709, 713, and is unaware of the data that is transmitted on the path 702, 703 that is not controlled by the other transmitter AI module 709, 713. Moreover, each transmitter AI module 709, 713 operates according to the conditions on its path 702, 703, independently of conditions on the other path.

The use of a distinct transmitter AI module 709, 713 for each path 702, 703 provides a number of advantages.

First, it allows the transmitter AI modules 709, 713 to be simpler, in terms of their construction and operation, than would be the case for a corresponding scenario in which a single transmitter AI module was constructed to optimise data transmission over two separate paths, especially considering the existence of multiple logical connections on the paths. This reduces the hardware requirement of the transmitter AI modules 709, 713.

Secondly, it allows each transmitter AI module 709, 713 to be highly responsive to the transmission conditions on its path 702, 703. Such would potentially be very difficult to achieve if a single AI module were used. This advantage is more significant because of the operation of the dispatcher 704 to supply transfer packets to paths according to the demands of those paths, as is described above.

Thirdly, it allows two very different paths 702, 703 to be used, whereas such may not even be possible, and would certainly be very difficult, to achieve using a single AI module. This can be particularly advantageous in situations where the transfer of larger amounts of data from portable devices, such as laptop computers and tablet computers, is desired. In such situations, the backing up or other transfer of contents of the portable device can utilise two distinct radio communication paths, such as WiFi and 4G cellular, or one such radio communication path and one wired communication path such as USB, Firewire, Thunderbolt, Ethernet etc.

The effectiveness of the operation of the two separate transmitter AI modules 709, 713 is enhanced if each transmitter AI module 709, 713 runs on a different thread, and preferably (although not necessarily) on different processor cores.

Performance of data transfer between the devices 1, 6, 7 and other devices 8, 9 can be maximised by providing a good balance between undersupply and oversupply of data to each of the elements in the path. This is achieved here using a forward looking feedback mechanism, which is described below. Balancing maximises performance because undersupply can cause interruption in the data flow and therefore a loss of performance. Also, oversupply can lead to critical commands or requests timing out, reducing performance.

For benefit of understanding this process, we will now explain how data flow is managed from between the modules in an example of data being supplied from the SAN 1, acting as a host and connected to the local bridge 3, through to the storage device 8 connected to the remote bridge 4 via the SAN 2, as depicted in FIG. 1 and present also in FIG. 7.

In response to the demand from the storage device 8, 9, the combiner/cache 705 supplies data to the storage device 8, 9. One or more water marks are provided in the cache 705. A water mark is a threshold that relates to a proportion of the quantity of data that can be stored in the data cache 705 (the capacity of the cache or the size of the cache). A high water mark may for instance be set initially by a receive AI module 710, 714 at 80% of the capacity of the data cache 705. A low water mark may for instance be set at 20% of the quantity of data that can be stored in the data cache 705. If there is more than one storage device 8, 9 connected to the cache 705 at a given time, each device 8, 9 has its own separate set of high and low water marks. Each of the water marks within the cache 705 can be adjusted by the AI module 710, 714.

Advantageously, the size of the data cache 705 is dynamically configurable. The size of the data cache 705 may be changed with changes in the number of storage devices 8, 9 connected to the remote bridge 4. That is, the size of the data cache 705 is increased or decreased according to the needs of the remote bridge 4. The size of the data cache 705 is controlled also so as to optimise performance of the transfer of data over the first and second paths 702, 703, having regards to the conditions of the system.

Advantageously, the size of the data cache 706 in the local bridge is dynamically configurable. The size of the data caches 706 within local bridge 3 may be changed with changes in the number of devices 8, 9 and the type(s) of device 8, 9 connected to the remote bridge 4. That is, the size of the data cache 706 is increased or decreased according to the needs of the remote bridge 4. The size of the data cache 706 is controlled also so as to optimise performance of the transfer of data over the first and second paths 702, 703, having regards to the conditions of the system. If there is more than one host port 13 connected to the cache 706, each host port has its own separate set of high and low water marks within the cache. The number of data caches 706 in the local bridge may be changed with changes in the number of devices 8, 9 and the type(s) of device 8, 9 connected to the remote bridge 4. A corresponding number of data caches are included in the remote bridge 4. In particular there are multiple caches 705. For the purpose of clarity, the functionality of a single cache relationship is primarily explained here, although some of the operation in a multi cache system also is described.

Information about the cache 705 (or caches, if there are plural caches) is used by the remote bridge 4 to calculate a measure of hungriness of the remote bridge 4. In particular, the information includes the internal high and low water marks in the cache 705. The information also includes the rate of data flow out of the cache 705 (the emptying speed) into the device 8, 9. If there are multiple devices 8, 9 active, the information fed back includes both the sets of high and low water marks, also the empty speed information is the combination of outward data flows of all the caches.

The information is used by the bridge 4 (in particular the receiver AI modules 710, 714) to calculate a measure of hungriness of the remote bridge 4, and in particular to calculate a measure of hungriness for each of the paths 702, 703.

In particular, the bridge 4 uses the information relating to the cache 705 along with information about the statuses of the FIFO buffers within the receive interfaces 708, 712, the value(s) of the TCP RWS parameter(s) for the paths, and the latencies of the paths 702, 703 to calculate a measure of hungriness for each of the paths 702, 703 with respect to the remote bridge 4.

Figure 12:
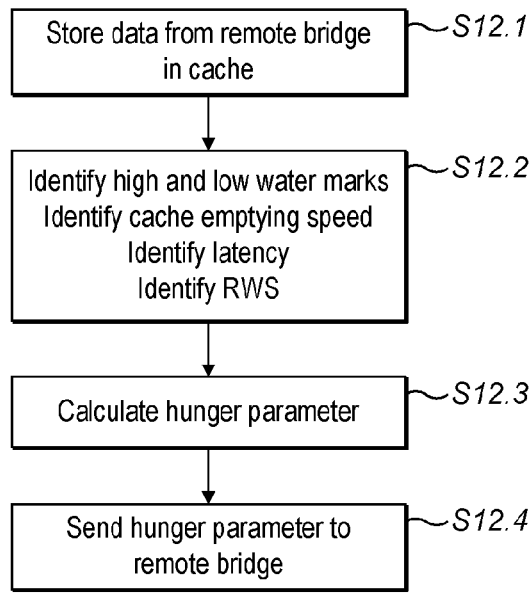
FIG. 12 is a flowchart showing operation of a remote bridge forming part of the system of FIG. 1 or FIG. 3.

This is shown in FIG. 12. As step S12.1, the cache 705 receives data from the local bridge 3. At step S12.2, the remote bridge 4 identifies the information relating to the cache 705 along with information about the statuses of the FIFO buffers within the receive interfaces 708, 712, the value(s) of the TCP RWS parameter(s) for the paths, and the latencies of the paths 702, 703. At step S12.3, the remote bridge 4 calculated the hunger parameter, which is a measure of hungriness, for each of the paths 702, 703 with respect to the remote bridge 4. At step S12.4, the hunger parameter(s) is/are sent to the local bridge 3.

In one example, hungriness is calculated as follows:

Remote hunger rate=$A*$(TCP RWS)+$B*$(FIFO status)+$C*$(Latency)+$D*$(cache empty speed)*1/sample rate.

Where A, B, C and D are variables, and constitute weighting factors.

The remote hunger rate calculated for each path 702, 703 is transmitted to the local bridge 3, which uses the rate to alter its operation in order to improve performance of the overall path from the SAN 1 to the device 8, 9.

In particular, the bridge 3 uses the remote hunger rates for the paths 702, 703 at the remote bridge 4 along with information about the statuses of the FIFO buffers within the transmit interfaces 707, 711 and the values of OTPS for the paths 702, 703 to calculate a measure of hungriness for each path 702, 703, as regards the local bridge 3.

In particular, the dispatcher 704 uses the remote hunger rates for the paths 702, 703 at the remote bridge 4 to calculate a measure of hungriness for each path 702, 703, as regards the local bridge 3.

Figure 13:
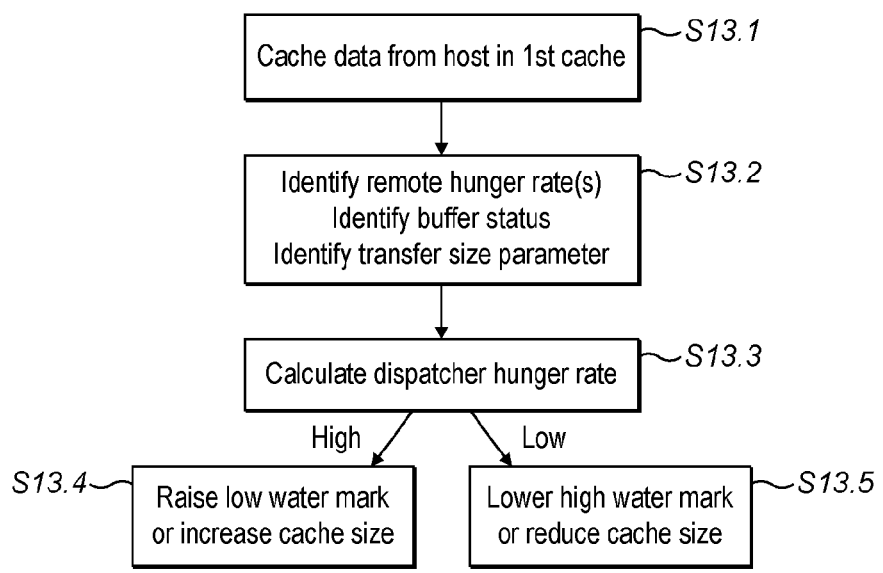
FIG. 13 is a flowchart showing operation of a dispatcher forming part of the system of FIG. 1 of FIG. 3.

This is shown in FIG. 13. At step S13.1, data from a host is cached in the cache 706. At step 13.2, information about the statuses of the FIFO buffers within the transmit interfaces 707, 711 and the values of OTPS for the paths 702, 703 is identified. At step S13.3, a dispatcher hunger rate, which is a measure of hungriness, is calculated for each path 702, 703, as regards the local bridge 3.

In one example, hungriness is calculated as follows:

Dispatcher hunger rate=$G*$(FIFO Status)+$H*$(OTPS)+$I*$(Remote hunger rate)*1/sample rate.

Where G, H and I are variables, and constitute weighting factors.

Instead of using the value of the TCP RWS parameter, the value of the NTS parameter can be used.

Also, instead of using the value of the OTPS parameter, the value of the NTS parameter can be used.

In the above, the parameter FIFO Status indicates the amount of data stored in the FIFO buffer in the relevant transmit interface 707, 711 or receive interface 708, 712.

The dispatcher hunger rate so calculated is used for two purposes.

First, the dispatcher hunger rate is used by the dispatcher 704 in the determination of which path to provide the next transfer packet. This is step S4 of FIG. 7, described above.

Secondly, the dispatcher hunger rate is used by the cache 706 of the local bridge 3. The cache 706 uses this rate to alter its operation in such a way as to optimise performance of the overall system.

The cache 706 controls the data flow to and from the host SAN via ports 13-1~13-$n$ which in this example are Fibre Channel ports (although they may instead be another SAN or storage protocol interface port such as Fibre Channel over Ethernet (FCoE) iSCSI, Serial attached SCSI (SAS), Parallel SCSI, Infiniband, etc.) or a file based protocol such as FTP or RESTful. Whatever the protocol, the data cache 706 incorporates a high and low water mark flow control system to manage the flow of data to and from the host 1, 6, 7, Flow is managed such as to provide a steady stream of data for use by the dispatcher 704. As the cache status approaches the lower water mark, the cache 706 starts to communicate to the host via the port 13 to request more commands (and the associated data) from the hosts 1, 6, 7. As the cache status approaches the high water mark, the cache 706 signals the host to stop sending data via a suitable message and/or a status flag.

In particular, the transmit AI modules 709, 713 provide the dispatcher hunger rate to the input cache 706. The cache 706 dynamically adjusts is size and/or its water marks having regard to the dispatcher hunger rate. Adjustment is such as to improve performance. Where the hunger rate (for a path or for the paths together) is high, the low water mark is raised, so as to result in more requests for data from the host 1, 6, 7—step S13.4 of FIG. 13. Where the hunger rate (for a path or for the paths together) is low, the high water mark is lowered, so as to result in fewer requests for data from the host 1, 6, 7—step S13.5 of FIG. 13. Similar results can be achieved by increasing the size of the cache when the dispatcher hunger rate is high and by reducing the size of the cache when the dispatcher hunger rate is low.

If the remote bridge 4 and its associated storage device 8 is far (for instance some thousands of kilometers) away from the local bridge 3 and the host 1, 6, 7, the time lag between the storage device demanding more data and the cache 706 issuing the request to the hosts to send more data can be large, and for instance may exceed one second. In prior art systems, this situation could result in periods where all the data in the various buffers and caches within the bridges could become emptied before the host has started to transfer the next sequence of commands and data.

This is avoided in the present embodiment by pre-charging the data cache 706 based on the remote hunger rate provided by the remote bridge 4. To pre-charge the data cache 706, the dispatcher hunger rate values are calculated by the transmit AI modules 709, 713 based on the remote hunger rate values, and the dispatcher hunger rate values are then used to change the size of the data cache 706 and modify the values of the lower and high water marks. For example, when a transmit AI module 709, 713 predicts the cache size is increased and the low water mark is moved up beyond the current cache address pointer to force the cache to start communications with the host to initial for commands and data. In a similar fashion, when the AI module determines that the data rate is above what it required, the cache size is reduced and/or the low water mark is decreased.

Optimum values for the parameters A, B, C, D, G, H and I are determined by varying the values of the parameters until optimum performance is achieved.

The aim of the feedback system is to maintain a constant data flow through all the elements in the system, in order to maximise the data flow between the storage device and the host. The feedback system can send both positive demand requirements, where there is spare capacity in the various elements in the data path, and negative demand requirements, to slow down the rate of data ingress from the host where it detects a that the rate of output data to the storage device is too low having regard to the input data rate from the host.

Although in the above two paths 702, 703 are used for the transmission of data, in other embodiments there are further paths. In these embodiments, each path has a respective transmit interface, a receive interface, a transmit interface, a transmit AI module and a receive AI module.

Except where two or more paths are required, the features that are described above in relation to the FIG. 3 embodiments apply also to the FIG. 1 embodiment. This applies to all features.

The logical connections may be TCP/IP connections or they may be logical connections according to some other protocol, whether standardized or proprietary.

The dispatcher 704, the first AI module 709 and the first transmit interface 707 described above are in some embodiments used without the second AI module and the second transmit interface. In these embodiments, only one path 5, 702 is present. However, plural logical connections are used and transfer packets, and network payload packets, are created such as to provide optimised transfer of data over the path 5, 702.

The data that forms the data in at the transmitter can take any suitable form. For instance, it may be backup data for recording on a tape or on disk. It may be remote replication data. It may be restore data, being used to restore data from a location where it had been lost. It may alternatively be file-based data from a file transmission protocol (FTP) sender. It may alternatively be stream from a camera, for instance an HTTP camstream. It may alternatively be simple object storage data. This is a non-exhaustive list.

Although the embodiments described above relate to a SAN, the apparatus and method can be used in other applications where data is transferred from one node to another. The apparatus and method can also be implemented in systems that use a protocol in which ACK messages are used to indicate successful data reception other than TCP/IP, such as those using Fibre Channel over Ethernet (FCOE), Internet Small Computer Systems Interface (iSCSI) or Network Attached Storage (NAS) technologies, standard Ethernet traffic or hybrid systems.

In addition, while the above described embodiments relate to systems in which data is acknowledged using ACK messages, the methods may be used in systems based on negative acknowledgement (NACK) messages. For instance, in FIG. 3, step s3.12, the processor 10 of the bridge 3 determines whether an ACK message has been received. In a NACK-based embodiment, the processor 10 may instead be arranged to determine whether a NACK message has been received during a predetermined period of time and, if not, to continue to data transfer using port i.

The invention claimed is:

1. Apparatus comprising:
   first and second transmitter interfaces, each configured to transmit data over a respective communications path including one or more logical connections;
   first and second transmit buffers forming part of the first and second transmitter interfaces respectively, the first and second transmit buffers being configured to store packets of data for transmission over their respective communication path;
   one or more path capability determining modules configured to determine a measure of capability of each of the communications paths to transmit data;
   an input data buffer configured to store data for provision to the first and second transmit buffers for subsequent transmission; and
   a data handling module configured to respond to determining the presence of data in the input buffer for transmission by:
      using the measured capabilities of the communication paths and measures of the quantity of data stored in the transmit buffers to select one of the first and second transmitter interfaces for transmitting data; and
      providing at least one packet of data to the transmit buffer of the selected one of the first and second transmitter interfaces.

2. Apparatus as claimed in claim 1, wherein the one or more path capability determining modules are configured to measure one or more transmission parameters and to use the measured one or more transmission parameters to determine the measure of capability of each of the communications paths to transmit data.

3. Apparatus as claimed in claim 2, wherein the one or more transmission parameters include one or more of: packet loss, latency and path speed.

4. Apparatus as claimed in claim 2, wherein the one or more transmission parameters include at least path speed.

5. Apparatus as claimed in claim 1, comprising first and second path capability determining modules, each relating to a different one of the communication paths.

6. Apparatus as claimed in claim 1, wherein the measure of capability of each of the communications paths to transmit data comprises a number of bytes that are required to be put onto the path per unit time.

7. Apparatus as claimed in claim 1, wherein the data handling module is configured to use a measure of a quantity of data that has been sent over the communications paths but for which acknowledgements have not yet been received to select one of the first and second transmitter interfaces for transmitting data.

8. Apparatus as claimed in claim 7, wherein the one or more path capability determining modules are configured to determine the quantity of data that has been sent over a communications path but for which acknowledgements have not yet been received.

9. Apparatus as claimed in claim 7, wherein the data handling module is configured to calculate a path satisfaction value as a function of path speed and a quantity of data that has been sent over a communications path but for which acknowledgements have not yet been received, and to use the path satisfaction value to select one of the first and second transmitter interfaces for transmitting data.

10. Apparatus as claimed in claim 1, wherein the providing the at least one packet of data to the transmit buffer of the selected one of the first and second transmitter interfaces comprises providing a transfer packet having a length equal to or less than an optimal packet length for the corresponding path.

11. Apparatus as claimed in claim 1, wherein the providing the at least one packet of data to the transmit buffer of the selected one of the first and second transmitter interfaces comprises:
  determining if a data segment in the input data buffer has a length exceeding the optimal packet length for the corresponding path;
  on a positive determination, forming a transfer packet having a length equal to the optimal packet length for the path, for provision to the transmit buffer of the selected one of the first and second transmitter interfaces; and
  providing the formed transfer packet to the transmit buffer of the selected one of the first and second transmitter interfaces.

12. A method comprising:
  each of first and second transmitter interfaces transmitting data over a respective communications path including one or more logical connections;
  each of first and second transmit buffers, forming part of the first and second transmitter interfaces respectively, storing packets of data for transmission over their respective communication path;
  one or more path capability determining modules determining a measure of capability of each of the communications paths to transmit data;
  an input data buffer storing data for provision to the first and second transmit buffers for subsequent transmission; and
  a data handling module responding to determining the presence of data in the input buffer for transmission by:
    using the measured capabilities of the communication paths and measures of the quantity of data stored in the transmit buffers to select one of the first and second transmitter interfaces for transmitting data; and
    providing at least one packet of data to the transmit buffer of the selected one of the first and second transmitter interfaces.

13. A method as claimed in claim 12, comprising the one or more path capability determining modules measuring one or more transmission parameters and using the measured one or more transmission parameters to determine the measure of capability of each of the communications paths to transmit data.

14. A method as claimed in claim 13, wherein the one or more transmission parameters include one or more of: packet loss, latency and path speed.

15. A method as claimed in claim 13, wherein the one or more transmission parameters include at least path speed.

16. A method as claimed in claim 12, wherein there are first and second path capability determining modules, each relating to a different one of the communication paths.

17. A method as claimed in claim 12, wherein the measure of capability of each of the communications paths to transmit data comprises a number of bytes that are required to be put onto the path per unit time.

18. A method as claimed in claim 12, comprising the data handling module using a measure of a quantity of data that has been sent over the communications paths but for which acknowledgements have not yet been received to select one of the first and second transmitter interfaces for transmitting data.

19. A method as claimed in claim 18, comprising the one or more path capability determining modules determining the quantity of data that has been sent over a communications path but for which acknowledgements have not yet been received.

20. A method as claimed in claim 18, comprising the data handling module calculating a path satisfaction value as a function of path speed and a quantity of data that has been sent over a communications path but for which acknowledgements have not yet been received, and using the path satisfaction value to select one of the first and second transmitter interfaces for transmitting data.

21. A method as claimed in claim 12, wherein the providing the at least one packet of data to the transmit buffer of the selected one of the first and second transmitter interfaces comprises providing a transfer packet having a length equal to or less than an optimal packet length for the corresponding path.

22. A method as claimed in claim 12, wherein the providing the at least one packet of data to the transmit buffer of the selected one of the first and second transmitter interfaces comprises:
  determining if a data segment in the input data buffer has a length exceeding the optimal packet length for the corresponding path
  on a positive determination, forming a transfer packet having a length equal to the optimal packet length for the path, for provision to the transmit buffer of the selected one of the first and second transmitter interfaces; and
  providing the formed transfer packet to the transmit buffer of the selected one of the first and second transmitter interfaces.

23. A method as claimed in claim 12, wherein the method is performed by a bridge.

24. Apparatus, the apparatus having at least one processor and at least one memory having computer-readable code stored therein which when executed controls the at least one processor to perform a method comprising:
  each of first and second transmitter interfaces transmitting data over a respective communications path including one or more logical connections;
  each of first and second transmit buffers, forming part of the first and second transmitter interfaces respectively, storing packets of data for transmission over their respective communication path;
  one or more path capability determining modules determining a measure of capability of each of the communications paths to transmit data;
  an input data buffer storing data for provision to the first and second transmit buffers for subsequent transmission; and
  a data handling module responding to determining the presence of data in the input buffer for transmission by:

using the measured capabilities of the communication paths and measures of the quantity of data stored in the transmit buffers to select one of the first and second transmitter interfaces for transmitting data; and providing at least one packet of data to the transmit buffer of the selected one of the first and second transmitter interfaces.

25. A non-transitory computer-readable storage medium having stored thereon computer-readable code, which, when executed by computing apparatus causes it to perform a method comprising:

each of first and second transmitter interfaces transmitting data over a respective communications path including one or more logical connections;

each of first and second transmit buffers, forming part of the first and second transmitter interfaces respectively, storing packets of data for transmission over their respective communication path;

one or more path capability determining modules determining a measure of capability of each of the communications paths to transmit data;

an input data buffer storing data for provision to the first and second transmit buffers for subsequent transmission; and a data handling module responding to determining the presence of data in the input buffer for transmission by:

using the measured capabilities of the communication paths and measures of the quantity of data stored in the transmit buffers to select one of the first and second transmitter interfaces for transmitting data; and providing at least one packet of data to the transmit buffer of the selected one of the first and second transmitter interfaces.

* * * * *